(12) United States Patent
Zhou et al.

(10) Patent No.: US 11,055,298 B2
(45) Date of Patent: Jul. 6, 2021

(54) DYNAMIC SAMPLING BASED ON TALENT POOL SIZE

(71) Applicant: Microsoft Technology Licensing, LLC, Redmond, WA (US)

(72) Inventors: Xiaochuan Zhou, Sunnyvale, CA (US); Shi Yan, San Jose, CA (US); Ted Tomlinson, Oakland, CA (US); Nikko David Bautista, San Francisco, CA (US); Daniel Francis, Belmont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 16/230,540

(22) Filed: Dec. 21, 2018

(65) Prior Publication Data

US 2020/0201857 A1 Jun. 25, 2020

(51) Int. Cl.
*G06F 16/2458* (2019.01)
*G06F 16/242* (2019.01)
*G06F 17/18* (2006.01)

(52) U.S. Cl.
CPC ........ *G06F 16/2462* (2019.01); *G06F 16/244* (2019.01); *G06F 17/18* (2013.01)

(58) Field of Classification Search
CPC .... G06F 16/2462; G06F 16/244; G06F 17/18; G06Q 10/105
See application file for complete search history.

(56) References Cited

U.S. PATENT DOCUMENTS

| 8,001,057 | B1* | 8/2011 | Hill | G06Q 10/10 |
| | | | | 705/321 |
| 8,117,024 | B2* | 2/2012 | Dane | G06F 40/211 |
| | | | | 704/9 |
| 8,775,605 | B2* | 7/2014 | Krishnamurthy | H04L 43/062 |
| | | | | 709/224 |
| 9,449,300 | B2* | 9/2016 | Kalscheuer | G06Q 10/1053 |
| 2008/0104089 | A1* | 5/2008 | Pragada | G06F 16/2471 |
| 2009/0276258 | A1* | 11/2009 | Dane | G06Q 10/063112 |
| | | | | 705/7.14 |
| 2010/0063948 | A1* | 3/2010 | Virkar | G06N 20/00 |
| | | | | 706/12 |

(Continued)

*Primary Examiner* — Robert W Beausoliel, Jr.
*Assistant Examiner* — Susan F Rayyan
(74) *Attorney, Agent, or Firm* — Schwegman Lundberg & Woessner, P.A.

(57) ABSTRACT

Apparatuses, computer readable medium, and methods are disclosed for dynamic sampling based on talent pool size. The method of dynamic sampling based on talent pool size may include determining, by at least one hardware processor, a talent pool based on a query from a user, where the talent pool comprises members and the members comprise attributes. The method further includes determining based on a size of the talent pool a sampling size number, where the attributes are represented by probability distribution functions. The method may further include determining an aggregate distribution of the attributes by combining the sampling size number of samples from each of the attributes and determining a range of a value of the aggregate distribution of the attributes. The method may further include causing the range of the value of the aggregate distribution of the attributes to be displayed to the user.

20 Claims, 15 Drawing Sheets

(56) References Cited

U.S. PATENT DOCUMENTS

2016/0239783 A1* 8/2016 Sahu ................... G06Q 10/105
2016/0292405 A1* 10/2016 Thomas ............ G06F 16/24575
2018/0089196 A1* 3/2018 Kenthapadi ........ G06Q 10/1057

* cited by examiner

ELECTRICAL ENGINEER ~402

63,868 PROFESSIONALS ON LINKEDIN®

| 63,868 | 21% | 4,534 | 4 YEARS |
| PROFESSIONALS | CHANGED JOBS | JOB POSTS | TENURE |

TOP LOCATIONS FOR THIS TALENT? ~404

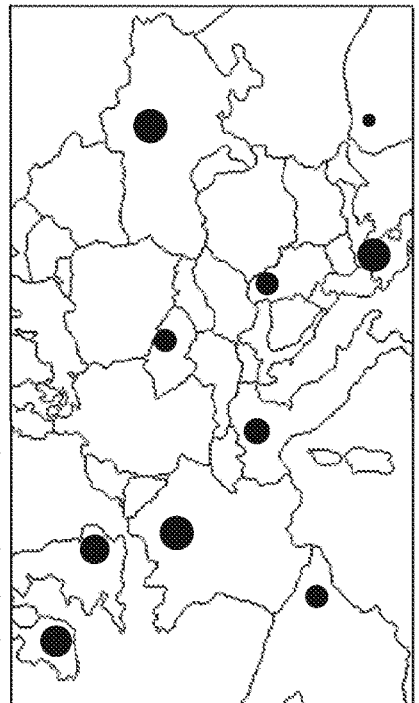

| TOP LOCATIONS | PROFESSIONALS |
| ATHENS, GREECE | 1,904 |
| DUBLIN, IRELAND | 1,685 |
| LONDON, UNITED KINGDOM | 1,322 |
| ISTANBUL, TURKEY | 1,286 |
| HELSINKI, FINLAND | 1,027 |
| ••• | ••• |

COMPANIES AND INDUSTRIES EMPLOYING THIS TALENT? ~406

| TOP INDUSTRIES | PROFESSIONALS |
| OIL AND ENERGY | 4,299 |
| ••• | ••• |

| TOP COMPANIES | PROFESSIONALS |
| COMPANY FOO | 677 |
| ••• | ••• |

SCHOOLS PRODUCING THIS TALENT ~408

| TOP FIELD OF STUDY | RECENT GRADS |
| ELECTRICAL ENGINEERING | 2,665 |
| ••• | ••• |

| TOP SCHOOLS | RECENT GRADS |
| FOO UNIVERSITY | 182 |
| ••• | ••• |

FIG. 4

```
602 ── SELECT AVG(baseSalaryMean) AS talentPoolBaseSalaryMean
604 ── FROM memberPositionEstimatedSalary
606 ── WHERE organizationId IN (1, 2, 3) AND <custom filters>
608 ── GROUP BY organizationId;
```

FIG. 6

| | SAMPLING NUMBER | TALENT POOL SIZE | TOTAL SAMPLE POINTS | PINOT QUERY LATENCY |
|---|---|---|---|---|
| 710 | 1 | >100,000 | 100,000-50M* | UP TO 500 MS |
| 712 | 10 | 1,000-100,000 | 10,000-1M | ~50MS |
| 714 | 100 | <1,000 | 0-100,000 | <50MS |

N = 50,000,000 or more
716

FIG. 7

```
1802 ⌇ SELECT

1804 ⌇ PERCENTILEEST10MV(baseSalarySampleSize10) AS
       baseSalaryRangeLowEnd, 1806 ⌇ PERCENTILEEST90MV(baseSalarySampleSize10) AS
       baseSalaryRangeHighEnd 1808 ⌇ FROM memberPositionEstimatedSalary 1810 ⌇ WHERE organizationId IN (1, 2, 3) AND <custom filters>

1812 ⌇ GROUP BY organizationId;
```

FIG. 18

```
1902 ⌇ SELECT

1904 ⌇ AVG(baseSalaryMean) AS talentPoolBaseSalaryMean,

1906 ⌇ PERCENTILEEST10MV(baseSalarySamples) AS
       baseSalaryRangeLowEnd,

1908 ⌇ PERCENTILEEST90MV(baseSalarySamples) AS
       baseSalaryRangeHighEnd

1910 ⌇ FROM memberPositionEstimatedSalary

1912 ⌇ WHERE organizationId IN (1, 2, 3) AND confidenceScore >
       0.8 AND <custom filters>

1912 ⌇ GROUP BY organizationId;
```

FIG. 19

DYNAMIC SAMPLING BASED ON TALENT POOL SIZE

TECHNICAL FIELD

Embodiments pertain to determining an estimated range and mean of a large number of attributes represented by probability distributions or histograms. Some embodiments relate to sampling probability distributions for database queries.

BACKGROUND

An online system may have hundreds of millions or even billions of members. The members may have attributes such as location, gender, etc. Members may want to perform searches of other members to gather information to help the member with decision making. The online system may provide a real-time interface for the member to perform the searches.

DESCRIPTION OF THE DRAWINGS

FIGS. 4 and 5 illustrate a display of information based on information entered with interface, in accordance with some embodiments;

FIG. 6 illustrates a method to determine an average of an attribute, in accordance with some embodiments;

FIG. 7 illustrates a table for dynamic sampling based on query response size, in accordance with some embodiments;

FIG. 18 illustrates a method to determine a range of an attribute, in accordance with some embodiments;

FIG. 19 illustrates a method to estimate an attribute of a member of a talent pool, in accordance with some embodiments;

DETAILED DESCRIPTION

Figure 1:
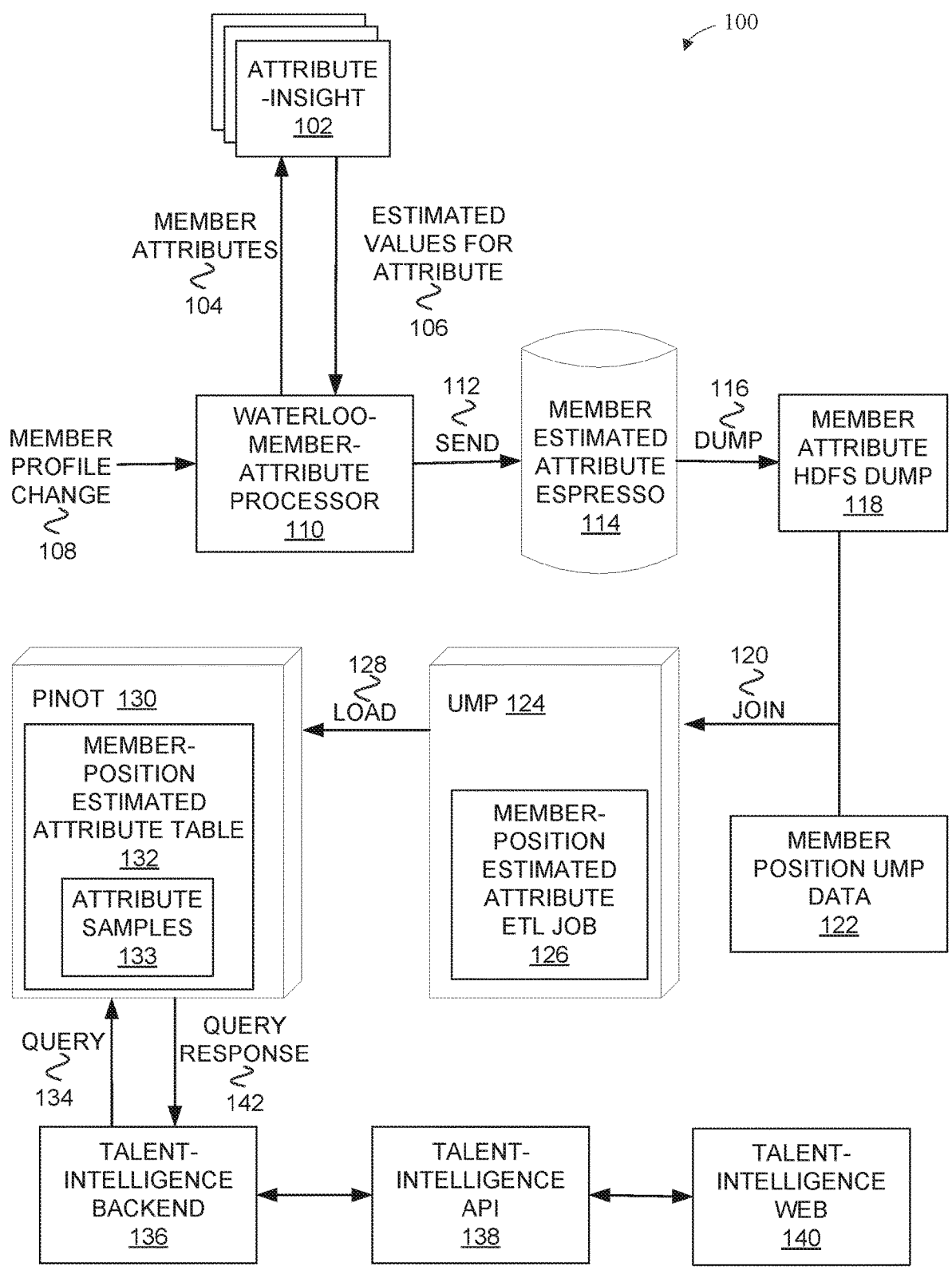
FIG. 1 is a block diagram illustrating a system for dynamic sampling based on talent pool size, in accordance with some embodiments.

The present disclosure describes methods, systems and computer program products for dynamic sampling based on talent pool size. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

A system for dynamic sampling based on talent pool size is disclosed. An online system, such as a social network system may have hundreds of millions or even billions of members. The members may have attributes such as salary, location, gender, etc. Members may want to perform searches for such things as new jobs or to gather information to help the member make a decision. For example, a member may be interested in what other members are paid and perform various searches of other members based on the attributes of members. However, it may be difficult to know attributes such as salary for members. The attribute such as salary needs to be estimated by the social network system. The estimate may be more complicated than a single number for accuracy. For example, a salary may be estimated with a histogram or probability distribution. It is difficult to estimate an attribute from many thousands or millions of attributes when the attributes are represented by a probability distribution. For example, a member of the social network system may perform a search with search criteria of the members of the social network system and retrieve a talent pool of one-million members with attributes that match the search criteria. 1n accordance with some embodiments, estimates (e.g., a 10 percent and 90 percent range) of probability distributions are estimated by taking samples of the probability distribution of each attribute of a member of the talent pool. But when the talent pool is large the number of samples (e.g., 100 or 1000 per attribute of a member of the talent pool) becomes very large, which takes a long time to process and cause delays in real-time interactions with members. In some embodiments, to reduce the number of samples, a number of samples per attribute is based on a talent pool size.

For example, only 1 sample may be taken from a probability distribution when the talent pool size is greater than 100,000. Ten (10) samples may be taken from a probability distribution when the talent pool is between 1,000 and 100,000. One-hundred (100) samples may be taken from a probability distribution when the talent pool is less than 1,000. In this way the number of samples to process (e.g., combine and then determine a 10/90 range) is reduced and the reliability of the estimate of the attribute (e.g., salary) from the attributes (e.g., salaries) of each member of the talent pool is not reduced when the number of samples is customized to the talent pool size. By selecting a number of samples according to the pool size, the system ensures that the amount of resources used is reduced while at the same time providing the member accurate estimates of the data.

FIG. 1 is a block diagram illustrating a system 100 for dynamic sampling based on talent pool size, in accordance with some embodiments. Illustrated in FIG. 1 is attribute-insight 102, member attributes 104, estimated values for attribute 106, member profile change 108, waterloo-member-attribute processor 110, send 112, member estimated attribute espresso 114, dump 116, member attribute Hadoop Distributed File System (HDFS) 118, join 120, member position unified metric platform (UMP) data 122, UMP 124, member-position estimated attribute En job 126, load 128, pinot 130, member-position estimated attribute table 132, attribute samples 133, query 134, talent-intelligence backend 136, talent-intelligence API 138, talent-intelligence web 140, and query response 142.

Figure 2:
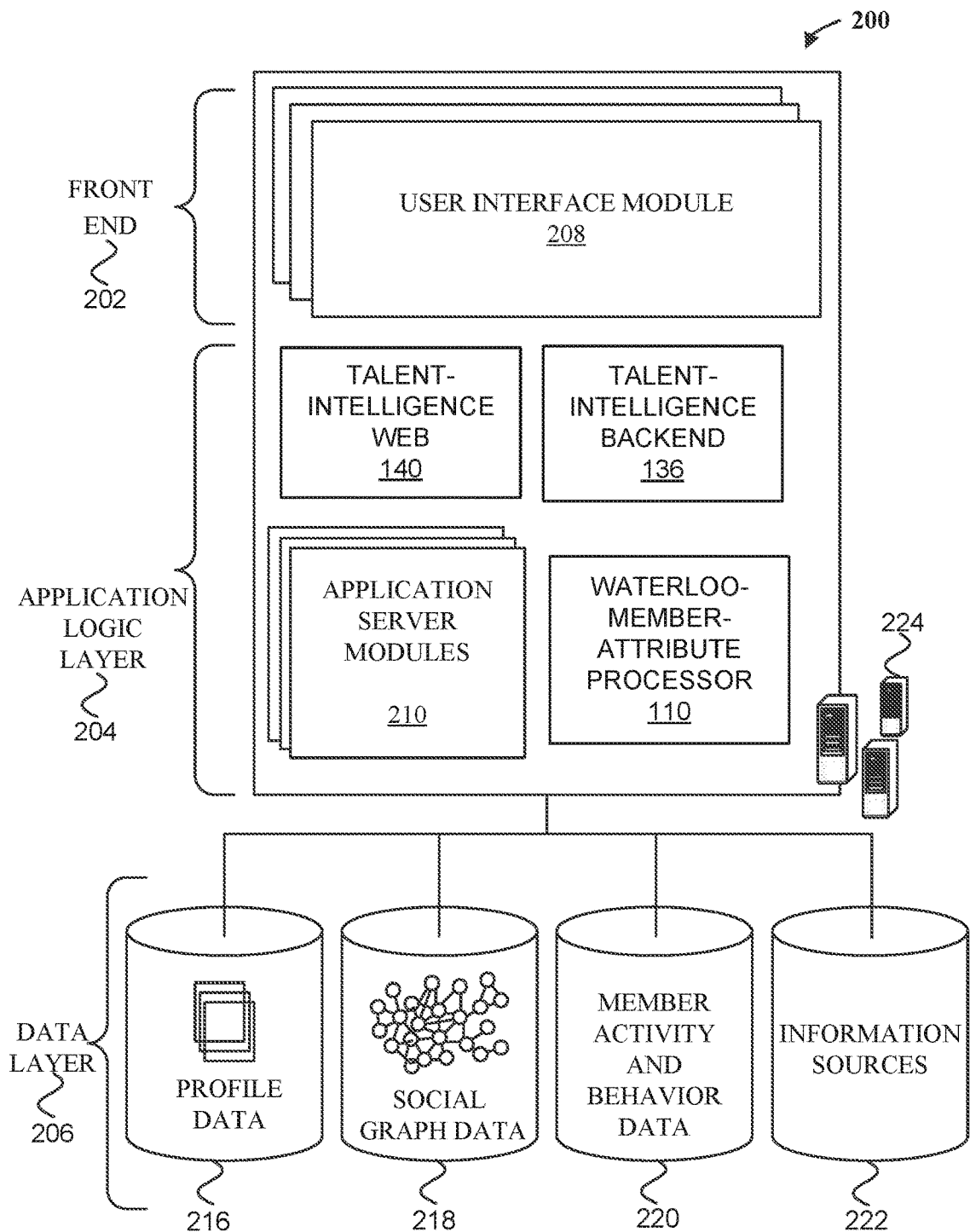
FIG. 2 is a block diagram of a social network system, in accordance with some embodiments.
Figure 15:
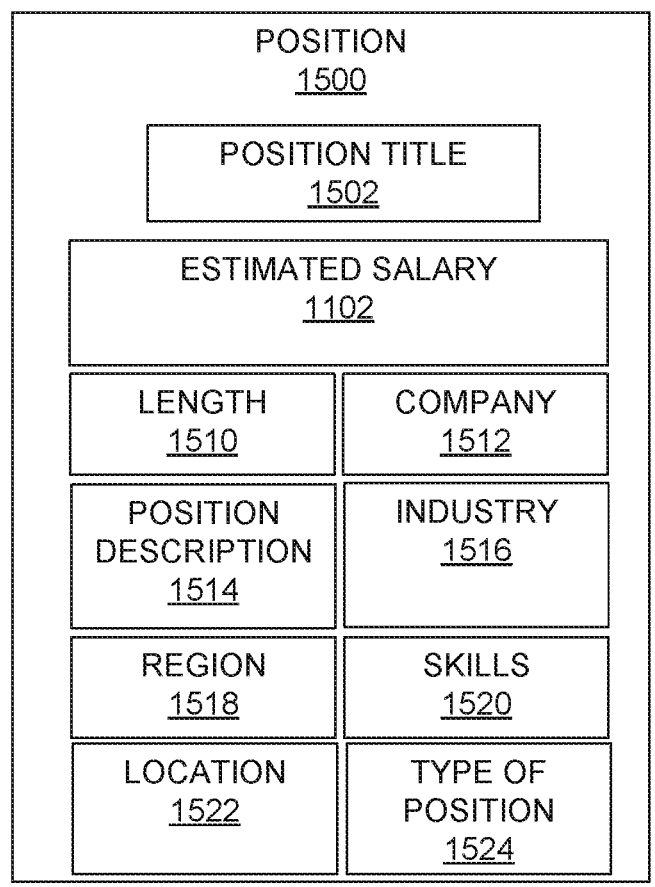
FIG. 15 illustrates a position, in accordance with some embodiments.
Figure 16:
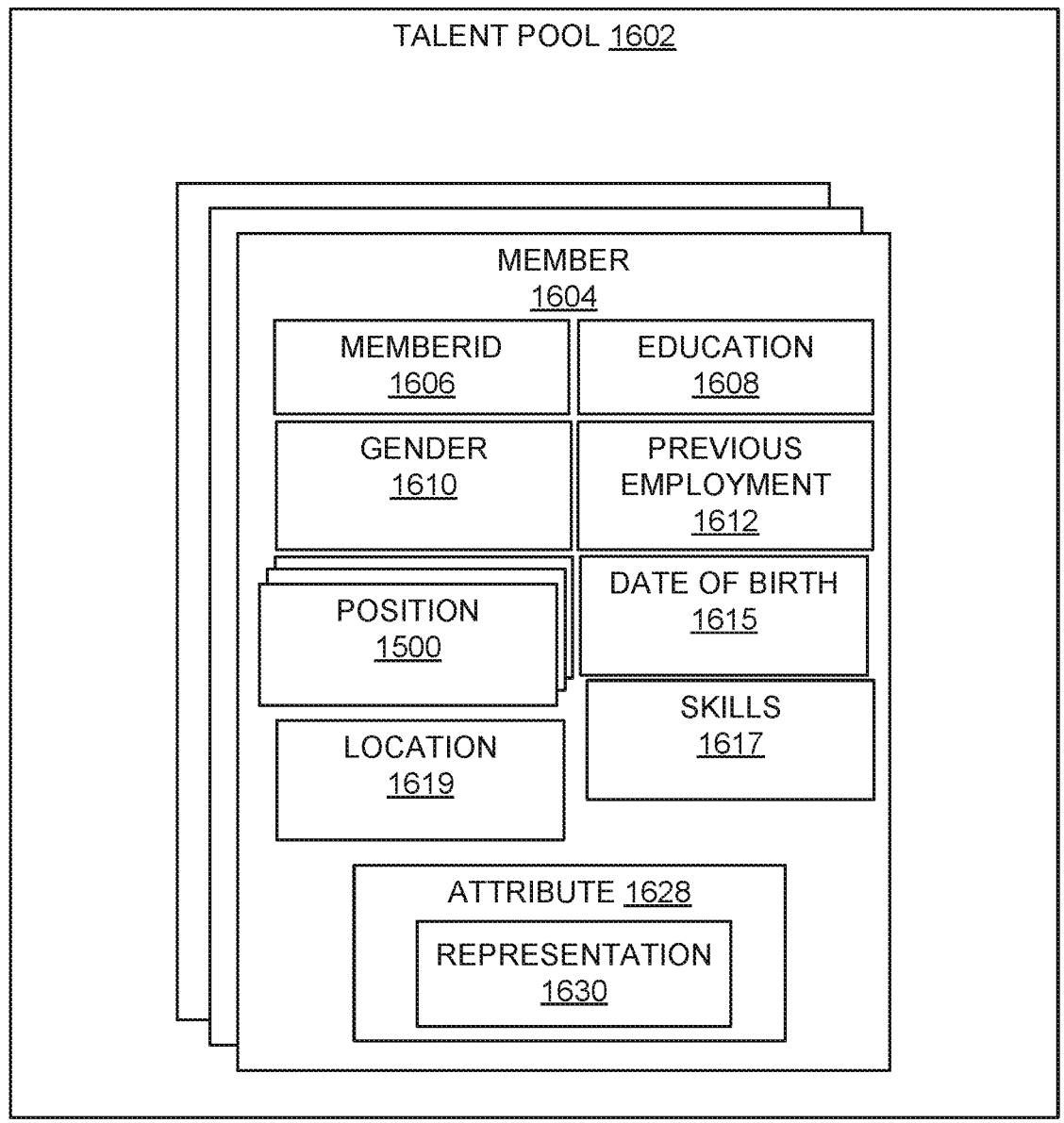
FIG. 16 illustrates a talent pool, in accordance with some embodiments.

An attribute may be an attribute of a profile data 216, e.g., job 1500 (FIG. 15), salary 1504, date of birth 1615, etc., as disclosed in conjunction with FIGS. 2, 15, and 16. A member profile change 108 may be a profile change, e.g., a member (e.g., a member may be a person) may change an attribute of their member profile or a change may be automatically made to the member profile, e.g., based on a date such as a work anniversary. The member profile may be stored in the data layer 206 such as the profile data 216.

The waterloo-member attribute processor 110 may be configured to listen to or detect member profile changes 108. When a member profile change 108 (e.g., member 1604) is detected, the waterloo-member-attribute processor 110 may call attribute-insight 102 with member attributes 104 (e.g., member 1604) to get estimated values for attributes 106. For example, if an attribute of position 1500 (e.g., FIG. 16) of member 1604 is changed then attribute-insight 102 may determine estimated salary 1504.

The attribute-insight 102 may be configured to take member attributes 104 and generate estimated values for attributes 106 (e.g., estimated salary 1504). The estimated values for attribute 106 are changes to the member attributes 104. For example, if attribute 1628 and representation 1630 was a representation of a value for the new attribute 1628, then estimated values for attribute 106 would include representation 1630.

In another example, if a member profile change 108 implicates a salary change (e.g., position title 1502), then the waterloo-member-attribute processor 110 will call attribute-insight 102 with the member attributes 104 to get an estimated salary (e.g., 1504) for each position of the member (e.g., position 1500), in accordance with some embodiments. A member 1604 may have more than one job or position 1500. In this case, the attribute-insight 102 is estimating attribute values (salaries for different positions) based on the member attributes 104 and other information that is available, e.g., one or more of the following may be used profile data 216, social graph data 218, member activity and behaviour data 220, and/or information sources 222 (e.g., this may include government tables for salaries or other outside sources that may include information for salaries).

In some embodiments, attribute-insight 102 may return values that indicate that there is not enough information to estimate a value for an attribute, e.g., there may not be enough information to estimate a value for salary (e.g., estimated salary 1504) for a position indicated in the member attributes 104. In some embodiments, attribute-insight 102 will return a probability distribution (e.g., 1107), mean and standard deviation (e.g., 1106), and/or a histogram (e.g., 1104), for the estimated salary (e.g., 1102) of each position (e.g., 1500) that the member has listed in their profile data 216 (e.g., 1604). The waterloo-member-attribute processor 110 may batch member profile changes 108. The attribute-insight 102 may use one or more of the methods (e.g., 600, 1800, 1900, 2000) described herein to estimate the attribute, e.g., estimated salary 1504.

The waterloo-member-attribute processor 110 may send 112 the estimated values for attribute 106 to member estimated attribute espresso 114. The member estimated attribute espresso 114 may be a table (e.g., a database table) that contains an estimated salary of all members (e.g., 1604) for each of their positions (position 1500) where there is enough data to estimate the salary (e.g., estimated salary 1504). The member estimated attribute espresso 114 may be a table in the data layer 206.

The member estimated attribute espresso 114 is dumped 116 to the member attribute HDFS dump 118, e.g., automatically once a day by an application server module 210. The member position UMP data 122 may be joined 120 with the member attribute HDFS dump 118 and loaded into UMP 124. The dump 116 may include a salary dump that contains estimated salary per member position, e.g., memberPositionUMPData. The member position UMP data 122 may include information such as memberID, organizationID, locationID, titleID, etc., which may be joined with the estimated salary per member position. In some embodiments, sensitive attributes (e.g., memberID, gender, previous employment, education, etc.) is removed to protect privacy. For example, waterloo-member-attribute processor 110, attribute-insight 102, member estimated attribute espresso 114, member attribute HDFS dump 118, UMP 124, member-position estimated attributed estimated transfer load (ETL) 126, Pinot 130, or another entity (or module) may be configured to remove attributes from member (e.g., 1604) so that the member (e.g., 1604) may be anonymous. For example, memberID 1606, education 1608, previous employment 1612, data of birth 1615, etc., may be removed, to form a new member (e.g., 1704).

In some embodiments, the currencies for the salary are converted to USD. Waterloo-member-attribute processor 110, attribute-insight 102, member estimated attribute expresso 114, member attribute HDFS dump 118, LIMP 124, Pinot 130, member-position estimated attribute ETL job 126, or another entity (or module) may be configured to convert an estimated attribute (e.g., estimated salary 1504) to a common currency, e.g., United States of America dollars. Currency conversion 1402 may perform the conversion from a source currency 1404 (e.g., estimated salary 1504) to a target currency 1406, in accordance with some embodiments.

In some embodiments, member-position estimated attribute ETL job 126 may sample an estimated salary (e.g., 1102) of a member (e.g., 1604). For example, for salary estimate 800, ETL job 126 may sample estimate 800 to determine attribute samples 902 (FIG. 9) for sampling number 702 (FIG. 7) with values of 1, 10, and 100. The estimated salary (e.g., 1102) may be represented by a histogram 1104, mean and standard deviation 1106, probability distribution 1107, and/or another appropriate representation. ETL job 126 may select the samples based on random samples and/or based on an interval of the probability distribution 1107, mean and standard deviation 1106, and/or a histogram 1104, in accordance with some embodiments. The samples may be stored in pinot 130 as attribute samples 133. In some embodiments, salary may be termed compensation. These samples may be used to generate compensation information (e.g., 510 of FIG. 5) such as average compensation (e.g., 512) and range (e.g., 514) based on a compound compensation distribution that may be used to determine a compensation range of a talent pool as disclosed herein (e.g., FIG. 7). A talent pool (e.g., 1602 or 1702) may be a result of a set of search parameters selected by a member, e.g., as disclosed in conjunction with FIG. 3. The join 120 that has been processed by member-position estimated attribute ETL job 126 may be an application server module 210.

The data processed by member-position estimated attribute ETL job 126 may be loaded 128 into pinot 130. Pinot 130 may be a database table, e.g., a Pinot table. Member-position estimated attribute table 132 may include the load 128 (of data) by member-position estimated attribute ETL job 126. Member-position estimated attribute table 132 may include attribute samples 133, which may include samples for attributes that are represented by a probability distribution, mean/variance, and/or a histogram, e.g., salary or compensation.

In some embodiments, an application that uses a database (e.g., Pinot) may have a latency of approximately 4.3 seconds to estimate percentile 90 for a talent pool of 20,000 members (20,000 members with 20 samples per member). The latency of 4.3 seconds may be too long for real-time use.

The talent-intelligence backend 136 may be configured to query 134 pinot 130 and to receive a query response 142. Talent-intelligence backend 136 may interact with talent-intelligence web 140, which may be based on talent-intelligence application program interface (API) 138. The talent-intelligence web 140 may use talent intelligence API 138 to access functions provided by talent-intelligence backend 136, e.g., to perform a query 134 and receive a query response 142. Talent-intelligence backend 136 may be an application server module 210. Talent-intelligence web 140 may be a user interface module 208. The talent-intelligence web 140 may be configured to provide an interface to a member to define a talent pool. The talent-intelligence web 140 may be configured to use the talent-intelligence API 138 to access functions provided by talent-intelligence backend 136 to query 134 pinot 130 and to receive query response 142. Talent-intelligence web 140 may implement the interface 300 described in conjunction with FIG. 3.

In some embodiments, sampling and then storing the attribute samples 133 in pinot 130 solves a technical problem of how to determine the samples that are requested in query 134 and return the sample in query response 142 for real-time interactive interfaces 208. Predetermining the samples may solve the problem of how to quickly generate samples and may provide a separation where the attribute samples 133 may be stored separately from large attribute representations (e.g., member attributes 102). The system 100 may have a memory for storing the large representations of the member attributes 104 and a memory to store the attribute samples 133, which may be a smaller memory that may quickly respond to the query 134. In some embodiments, the member attributes 102 are stored in a different memory than the samples 133. This may enable a memory that is more accessible to be used for the samples 133. In some embodiments, a different server is used to determine the samples 133 than is used to respond to query 134. This may enable a more accessible server to process the query 134.

FIG. 2 is a block diagram of a social network system 200, in accordance with some embodiments. The social network system 200 may be based on a three-tiered architecture, comprising a front-end layer 202, application logic layer 204, and data layer 206. Some embodiments implement the social network system 200 using different architectures. The social network system 200 may be implemented on one or more computers 224. The computers 224 may be servers, personal computers, laptops, portable devices, etc. The computers 224 may be distributed across a network. The social network system 200 may be implemented in a combination of software, hardware, and firmware.

As shown in FIG. 2, the front end 202 includes user interface modules 208. The user interface modules 208 may be one or more web services. The user interface modules 208 receive requests from various client-computing devices, and communicate appropriate responses to the requesting client devices. For example, the user interface modules 208 may receive requests in the faun of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 2, the data layer 206 includes profile data 216, social graph data 218, member activity and behaviour data 220, and information sources 222. Profile data 216, social graph data 218, and member activity and behaviour data 220, and/or information sources 222 may be databases. One or more of the data layer 206 may store data relating to various entities represented in a social graph. In some embodiments, these entities include members, companies, and/or educational institutions, among possible others. Consistent with some embodiments, when a person initially registers to become a member of the social network system 200, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current position title, position description, industry, employment history, skills, professional organizations, and so on. This information is stored as part of a member's member profile, for example, in profile data 216. The profile data 216 may include the member 1604 and 1704.

With some embodiments, a member's profile data will include not only the explicitly provided data, but also any number of derived or computed member profile attributes and/or characteristic, which may become part of one of more of profile data 216, social graph data 218, member activity and behaviour data 220, and/or information sources 222.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data 218. With some embodiments the social graph data 218 may be implemented with a graph database, which is a particular type of database that uses graph strictures with nodes, edges, and properties to represent and store data. In this case, the social graph data 218 reflects the various entities that are part of the social graph, as well as how those entities are related with one another.

With various alternative embodiments, any number of other entities might be included in the social graph data 218, and as such, various other databases may be used to store data corresponding with other entities. For example, although not shown in FIG. 2, consistent with some embodiments, the system may include additional databases for storing information relating to a wide variety of entities, such as information concerning various online or offline people, position announcements, companies, groups, posts, job posts, slide shares, and so forth.

With some embodiments, the application server modules 210 may include one or more activity and/or event tracking modules, which generally detect various user-related activities and/or events, and then store information relating to those activities/events in, for example, member activity and behaviour data 220. For example, the tracking modules may identify when a user makes a change to some attribute of his or her member profile, or adds a new attribute and may trigger waterloo member-attribute processor 110. Additionally, a tracking module may detect the interactions that a member has with different types of content. For example, a tracking module may track a member's activity with respect to position announcements, e.g. position announcement views, saving of position announcements, applications to a position in a position announcement, explicit feedback regarding a position announcement (e.g., not interested, not looking, too junior, not qualified, information regarding the position the member would like, a location member wants to work, do not want to move, more like this, etc.), position search terms that may be entered by a member to search for position announcements.

Such information may be used, for example, by one or more recommendation engines to tailor the content presented to a particular member, and generally to tailor the user experience for a particular member. Information sources 222 may be one or more additional information sources. For example, information sources 222 may include external sources that include job posting that may be used to estimate attributes such as salary.

The application server modules 210, which, in conjunction with the user interface module 208, generate various user interfaces (e.g., web pages) with data retrieved from the data layer 206. In some embodiments, individual application server modules 210 are used to implement the functionality associated with various applications, services and features of the social network service. For instance, a messaging application, such as an email application, an instant messaging application, or some hybrid or variation of the two, may be implemented with one or more application server modules 210. Of course, other applications or services may be separately embodied in their own application server modules 210. In some embodiments applications may be implemented with a combination of application service modules 210 and user interface modules 208. For example, a dynamic sampling system based on talent pool size may be implemented with a combination of back-end modules, front-end modules, and modules that reside on a user's computer 118. For example, the social network system 200 may download a module to a web browser running on a user's computer (not illustrated), which may communicate with an application server module 210 running on a server 224 which may communicate with a module running on a back-end database server (not illustrated).

The social network system 200 may provide a broad range of applications and services that allow members the opportunity to share and receive information, often customized to the interests of the member. For example, in some embodiments, the social network system 200 may include an application (e.g., waterloo-member-attribute processor 110, talent-intelligence backend 136, and talent-intelligence web 140) that allows members to enter criteria (e.g., see FIG. 3) that selects a talent pool 1602, 1702 and have displayed an estimated salary (e.g., average 512) for the talent pool 1602, 1702.

With some embodiments, members of a social network service may be able to self-organize into groups, or interest groups, organized around a subject matter or topic of interest. Accordingly, the data for a group may be stored in social graph data 218. When a member joins a group, his or her membership in the group may be reflected in the social graph data 218. In some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data 218.

In addition to the various application server modules 210, the application logic layer 204 includes a talent-intelligence web 140, talent-intelligence backend 136, and waterloo-member-attribute processor 110, in accordance with some embodiments. As illustrated in FIG. 2, in some embodiments the application logic layer includes a talent-intelligence web 140, talent-intelligence backend 136, and waterloo-member-attribute processor 110 that may be implemented as a service that operates in conjunction with various application server modules 210 and user interface modules 208. For instance, any number of individual application server modules 210 can invoke the functionality of talent-intelligence web 140, talent-intelligence backend 136, or waterloo-member-attribute processor 110. However, with various alternative embodiments, one or more of talent-intelligence web 140, talent-intelligence backend 136, and waterloo-member-attribute processor 110 may be implemented as an application server module 210 such that it operates as a stand-alone application.

In some embodiments, one or more of a talent-intelligence web 140, talent-intelligence backend 136, and waterloo-member-attribute processor 110 includes or has an associated publicly available API that enables third-party applications to invoke the functionality of a talent-intelligence web 140, talent-intelligence backend 136, and waterloo-member-attribute processor 110, respectively.

As is understood by skilled artisans in the relevant computer and Internet-related arts, each module or engine shown in FIG. 2 represents a set of executable software instructions and the corresponding hardware (e.g., memory and processor) for executing the instructions. To avoid obscuring the disclosed embodiments with unnecessary detail, various functional modules and engines that are not germane to conveying an understanding of the inventive subject matter have been omitted from FIG. 2. However, a skilled artisan will readily recognize that various additional functional modules and engines may be used with a social network system, such as that illustrated in FIG. 2, to facilitate additional functionality that is not specifically described herein. Furthermore, the various functional modules and engines depicted in FIG. 2 may reside on a single server computer or may be distributed across several server computers in various arrangements. Moreover, although depicted in FIG. 2 as a three-tiered architecture, the disclosed embodiments are by no means limited to such architecture.

Figure 3:
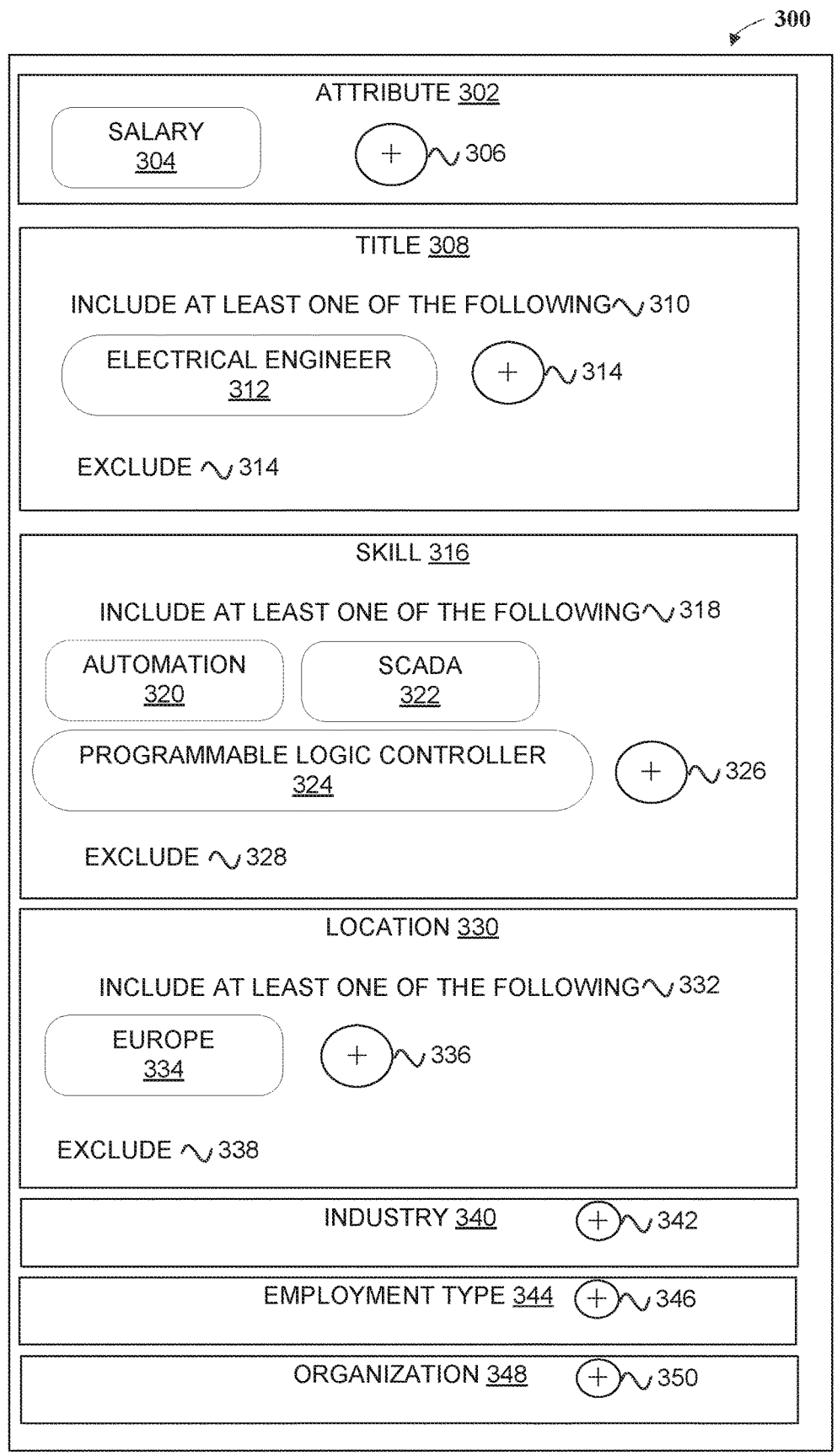
FIG. 3 illustrates an interface for entering a database query to the data layer, in accordance with some embodiments.

FIG. 3 illustrates an interface 300 for entering a database query to the data layer 206, in accordance with some embodiments. Illustrated in FIG. 3 is attribute 302, title 308, skill 316, location 330, industry 340, employment type 344, and organization 348. The interface 300 enables a member to enter information that is used for a database query, e.g., talent-intelligence web 140 may use talent intelligence API 138 to access functions provided by talent-intelligence backend 136 to form query 134. The interface 300 may be provided by one or more user interface modules 208. The interface 300 may include additional options for a user to enter information regarding attributes of members of the social network system 200. The result of the database query may be a talent pool 1602, 1702.

The attribute 302 may be an attribute, e.g., salary 304. The attribute 302, skill 316, location 330, industry 340, and employment type 344 may be a field that is maintained or estimated for profile data 216. Members may have multiple positions in profile data 216.

Button 306 enables a member to add additional attributes, which may include any attribute of members, e.g., 1604, 1704, in accordance with some embodiments. The attribute 302 selected is salary 304, e.g., estimated salary 1102. The title 308 may be a job title (e.g., position title 1502, which is an attribute of member 1604, 1704) such electrical engineer 312. "Include at least one of the following" 310 may indicate the type of query that will be performed, e.g., the query should be an "or" for the titles 308 included. The button 314 enables additional titles 308 to be added. Exclude 314 enables the member to add titles 308 that will be excluded from the database query.

The skill 316 may be skills associated with members in profile data 216, e.g., skills 1617 and/or skills 1520 associated with a position 1500. The skills 316 may include automation 320, supervisory control and data acquisition (SCADA) 322, and programmable logic controller 324. The button 326 may enable a member to add an additional skill to the database query. Include at least one of the following 318 may indicate the type of query that will be performed. Selecting button 326 may bring up a list of skills 316 associated with the current title 308. Exclude 328 enables the member to add skills 316 that will be excluded from the database query.

The location 330 may be locations of the members in profile data 216, e.g., location 1619 of member 1604, and may be the location of the positions, e.g., location 1522 of position 1522. Europe 334 is a location 330. "Include at least one of the following" 332 may indicate the type of query that will be performed. The button 336 enables additional locations 336 to be added. Exclude 338 enables the member to add locations 330 that will be excluded from the database query.

industry 340 may be an industry for the position, e.g., industry 1516 for position 1500. Button 342 enables the member to add an industry. Employment type 344 may be a type of employment for the position such as permanent or contract, e.g., type of employment 1524 of position 1500. Button 346 enables the member to add an employment type 344 to the database query. Organization 348 may be a type of organization such as company or corporation, e.g., company 1512 of position 1500. Button 350 enables the member to add an organization 348 to the database query. In some embodiments, the interface 300 may enable the member, e.g., 1604, 1704, to enter additional information. In some embodiments, the interface 300 may be termed salary insights.

Figure 5:
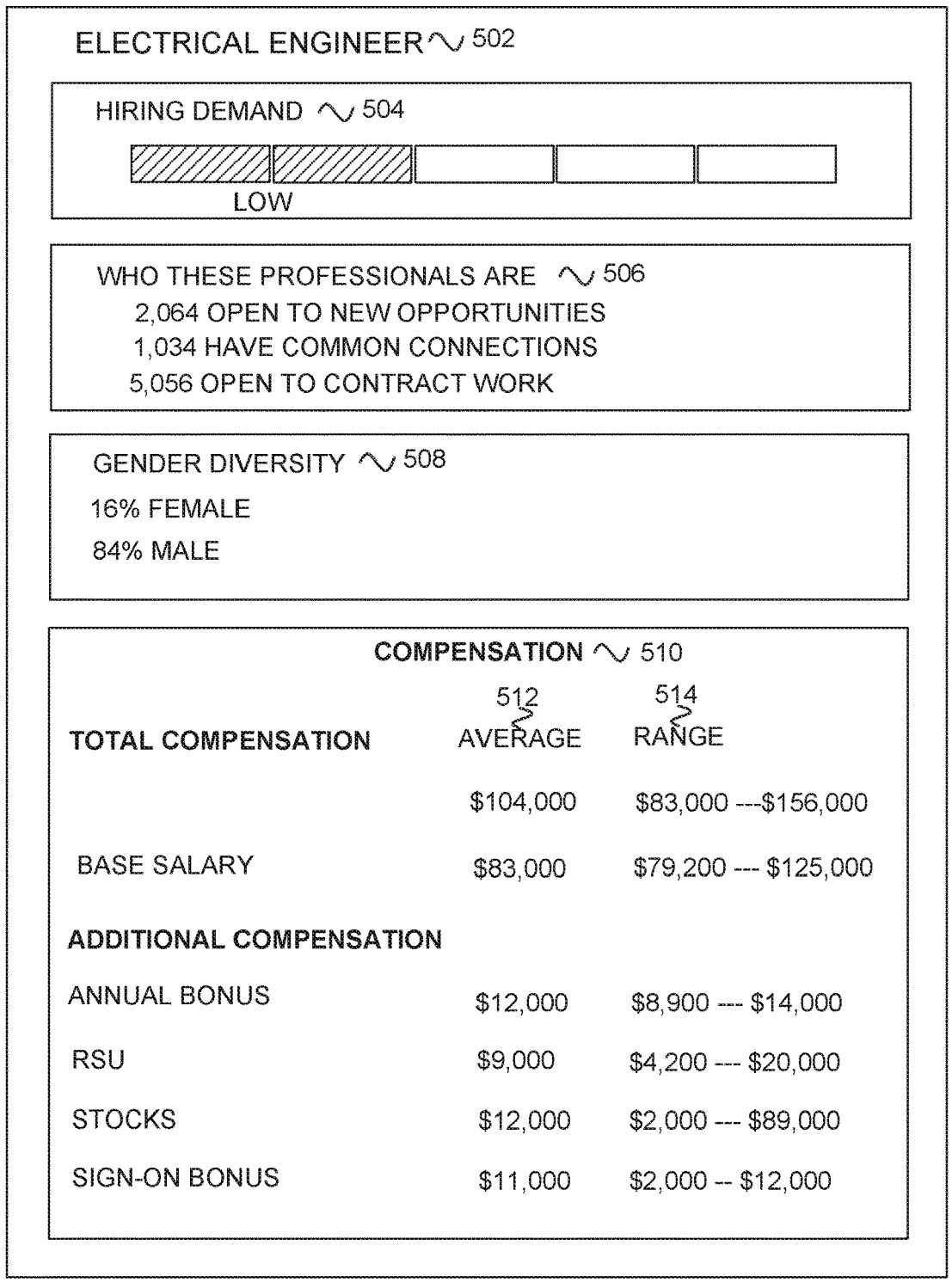

FIGS. 4 and 5 illustrate a display of information 400 and 500 based on information entered with interface 300, in accordance with some embodiments. Illustrated in FIGS. 4 and 5 is electrical engineer 402 (e.g., position title 1502), top locations for this talent 404 (e.g., location 1522), companies and industries employing this talent 406 (industry 1516 and company 1512), schools producing this talent 408 (e.g., education 1608), and electrical engineer 502 (e.g., position title 1502), hiring demand 504 (e.g., may be derived based data layer 206 information regarding positions 1500), who these professionals are 506 (e.g., may be derived based on data layer 206 information regarding members 1604, 1704), gender diversity 508 (e.g., gender 1610), and compensation 510 (e.g., estimated salary 1102).

The display of information 400 and 500 may be from one or more user interface modules 208 with the information being displayed from a query response 142 based on the information entered in interface 300 and formed into a query 134.

Electrical Engineering 402 may indicate that 63,868 professionals on a social media site, e.g., LinkedIn®, have at least one position with the title of Electrical Engineer 402. The number of professionals may be termed the talent pool size (e.g., talent pool 1602, 1702). Electrical Engineer 402 may indicate that 21% of the 63,868 have changed jobs, that there is 4,534 job posts for Electrical Engineer, and that the average tenure at the position with the title 308 of Electrical Engineer 402 is 4 years. This information may be derived based on information from the data layer 206 stored regarding, for example, member activity and behaviour data 220 as well as job or position posts.

The top locations for this talent 404, e.g., members in the profile data 216 that match the information entered in interface 300, include top locations and professionals, e.g., Athens, Greece with 1,904, etc. A map may be displayed that indicates with a circle the relative number of professionals.

Companies and industries employing this talent 406 indicates Top Companies and Professionals that match the information entered in interface 300. For example, Company Foo may employ 677 Electrical Engineers that have the skills 316 and location 330 indicated in interface 300. In the case of FIG. 3, no industry 340 or organization 348 was entered so all organizations and industries would match the query 134 formed from the information enter in FIG. 3.

Schools producing this talent 408 indicates Top Schools and Recent Grads that match the information entered in interface 300. For example, Foo University may have recently graduated 182 people. And, a Top Field of Study may be Electrical Engineering with 2,665 graduates.

Electrical Engineer 502 may include hiring demand 504, who these professionals are 506, gender diversity 508, and compensation 510. The hiring demand 504 may indicate Low, which may be an indication of how many posts there are with the position title Electrical Engineering as well as other factors such as how long a post last before being filled, relative compensation over time, etc. Who These Professionals Are 506 may indicate that 2,064 are open to new opportunities, 1,034 have common connections, and 5,056 are open to contract work. This information may be determined based on, for example, member activity and behaviour data 220. Gender diversity 508 indicates that 16% of the people that match the information entered in interface 300 are women and 84% are male.

Compensation 510 (e.g., estimated salary 1102) may indicate total compensation and additional compensation for members that match the information entered into the interface 300. The total compensation may include a median and range, e.g., $104,000 median total compensation and $83,000-$156,000 range of total compensation. The median and range may be determined based on the methods described herein, e.g., FIGS. 6, 18, and 19. The compensation 510 may be broken down between base salary (e.g., base salary 1110), e.g., median $83,000 and range $79,200-$125,000, and additional compensation. The additional compensation may include one or more components, e.g., as illustrated annual bonus (e.g., annual bonus 1114) with a median of $12,000 and a range of $8,900-$14,000, restricted stock units (RSL) (e.g., stock 1116 or stock options 1118) with a median of $9,000 and a range of $4,200-$20,000, stocks with a median of $12,000 and a range of $2,000-$89,000, and sign-on bonus (e.g., sign-on bonus 1120) with a median of $11,000 and a range of $2,000-$12,000. In some embodiments, the interface 300 may include options for selecting a currency (e.g., currency 1122) for the compensation 510. In some embodiments, there may be a total compensation, e.g., total compensation 1112, which may be an estimate of all the components of the compensation or a subset of the components of the compensation. In some embodiments, the interface 300 may include options for whether gender diversity 508 is displayed. In some embodiments, the interface 300 provides options for whether compensation 510 is broken down into more than just total compensation, e.g., whether or not additional compensation is displayed. In some embodiments, the presentation of the information 400 and 500 is done in real-time after a member enters the information in interface 300.

FIG. 6 illustrates a method 600 to determine an average of an attribute, in accordance with some embodiments. Illustrated in FIG. 6 is operations 602, 604, 606, and 608 to determine an average of an attribute, e.g., referring to FIG. 5, method 600 may be used to determine the average 512 compensation of $104,000. Method 600 may be performed by talent-intelligence web 140, talent-intelligence backend 136, and/or pinot 130. Method 600 may be a Pinot query, e.g., query 134. Method 600 may be a database query. Talent-intelligence web 140 may use talent-intelligence API 138 to call functions provided by talent-intelligence backend 136 to perform method 600, e.g., with parameters for operations (e.g., 602, 604, 606, 608). A query response 142 is returned to talent-intelligence web 140, e.g., $104,000, in accordance with some embodiments.

Operation 602 may select an average (AVG) of basesalarymean as talentpoolbasesalarymean. Average indicates that all the selected "memberPositionEstimateSalary" (operation 604) should be averaged. The talent pool is defined by operation 606, "organizationID IN (1,2,3)" and "<custom filters>". The "<custom filters>" may be other criteria, e.g., the information entered on interface 300 such as title 308 of electrical engineer. Referring to FIGS. 3 and 4, the talent pool may be the 63,868 professionals on LinkedIn® that meet the criteria indicated on interface 300 including title 308 of electrical engineering 312 (or FIG. 4 402). Operation 604 may indicate a field for the average or mean of the base salary, e.g., memberPositionEstimatedSalary. Operation 606 may indicate the organizations and other filters (e.g., customer filters) to determine the talent pool to take the mean salary or compensation. For example, the interface 300 would include skill 316 as part of the customer filters. Interface 300 has organization 348 so that the member could add specific organizations. Operation 606 is performing the query for the top three organizations ("organizationID IN (1, 2, 3)"). Operation 608 indicates that the results of the query should be grouped by organization identification. Method 600 may be used to determine an average or mean of an attribute for a talent pool where the mean or average is a stored value of each member of the talent pool.

FIG. 7 illustrates a table 700 for dynamic sampling based on query response size, in accordance with some embodiments. Illustrated in FIG. 7 is sampling number 702, talent pool size 702, total sample points 706, pinot query latency 708, row 710, row 712, row 714, and N 716. N 716 indicates 50 million is the database size or universe size, e.g., social network system 200 with 50 million members. Different database sizes or universe sizes may be used, e.g., 5, 30, 200, 500, 1,000, or 5,000 million, etc., in accordance with some embodiments.

The table 700 may be used to determine a value to use for a sampling number 702 to estimate an attribute value, e.g., a salary estimate, e.g., average 512. The sampling number 702 indicates a sample size that may be used from a salary estimate 800. For example, for a sampling number 702 with a value of 1 indicates there is one sample randomly taken from a salary estimate 800. For example, an attribute sample 902 may include the salary 904 and the probability 906 as disclosed in conjunction with FIG. 9.

The talent pool size 704 (e.g., talent pool 1602, 1702) indicates the number of members (e.g., member 1604, 1704) or job positions that match a set of search parameters, e.g., as disclosed in conjunction with FIG. 3. The total sample points 706 is equal to the sampling number 702 multiplied by the talent pool size 704. The total sample points 706 indicates the difficulty in determining the estimated attribute value, e.g., salary estimate 512. The Pinot query latency 708 indicates an estimated time to perform a Pinot query to retrieve the total sample points 706.

Determining an attribute (e.g., salary or compensation) that is represented by a probability distribution (e.g., salary estimate 800) may be more difficult than when the attribute is represented by a mean or average.

Talent-intelligence web 140 (or another application, e.g., application server modules 210) may be configured to determine a range (e.g., 514) and average (e.g., 512) of an attribute from a talent pool of the attributes represented by a probability distribution. Talent-intelligence web 140 (or another application, e.g., application server modules 210) may not be able to simply determine a percentile 10/90 on the means or medians of each attribute of the talent pool. This determination would use one point (mean or median) to represent a probability distribution of the attribute (e.g., salary) and the result would be incorrect. The talent-intelligence web 140 and/or talent-intelligence backend 126 are configured to mix each of the probability distributions of the talent pool of the attribute (e.g., salary) together to construct a compound distribution from the attributes (e.g., salaries) of the talent pool. For example, mix together attribute samples 902, the attribute samples could be ordered by salary 904. The talent-intelligence web 140 and/or talent-intelligence backend 126 can then determine a 10 percent value and 90 percent value on the new compound distribution to determine a range, e.g., range 514.

To construct a compound distribution (e.g., a compound salary distribution) for a talent pool (talent pool 1602, 1702), talent-intelligence web 140 may generate a fixed number of samples from each probability distribution of each attribute of the talent pool. For example, 1, 10, or 100 samples may be taken from the probability distribution of the attribute to represent the probability distribution of this attribute. The compound attribute distribution of the attributes of a talent pool is determined by the distribution generated from combining all of the samples taken from the individual attributes' probability distributions. For example, if 100 samples are generated for each attribute (e.g., estimated salary 1102 or attribute estimate 1002) of each member of a talent pool (e.g., members) of 1,000, then a construction of the compound distribution of the talent pool of 1,000 members would put 100 samples (e.g., attribute sample 902) multiplied by 1,000 (one for each member or attribute, e.g., 100*1,000). To determine a range the percentiles 10 and 90 can be determined from the compound distribution. A member of the talent pool may have more than one attribute with a probability distribution, e.g., a member may have multiple positions or jobs listed in their profile data 216.

For 100 samples per attribute, a large number of data points for a large talent pool will be generated. For example, for a talent pool search of title 308 (FIG. 3) equal to "Software Engineer," talent-intelligence web 140 may return a talent pool of 3 million attributes, e.g., 3 million members with a job title of "Software Engineer." 100 samples per attribute (e.g., probability distribution of the salary of the members) would be 100*3 million (M) or 300M data points that would have to be estimated in real-time (e.g., by talent-intelligence web 140 or pinon 130). In some embodiments, processing 300 M data points in real-time requires about 3 seconds. This amount of time may be acceptable interaction delay but may be too long of an interaction delay for real-time users of the interface 300 and the system 100 for dynamic sampling based on query response size. As disclosed in conjunction with FIG. 1, the use of internal functions (e.g., T-Digest of Pinon) may result in long interaction delays.

In some embodiments, dynamic sampling based on talent pool (e.g., talent pool 1602, 1702) size is used. Statistically, a 100 sampling points per attribute (e.g., estimated salary 1102) is not needed if the number of attributes or talent pool is large enough. This is because a large talent pool contains many attributes (e.g., salary) from the same search, one sample per member added together is good enough to represent the whole talent pool 1602, 1702.

In some embodiments, three multi-value columns in Pinot table are used to store 1, 10, or 100 samples per attribute (e.g., attribute sample 902) of a member (e.g., 1604, 1704). For example, samples of an attribute (e.g., attribute estimate 1002) may be stored. For example, sample number 702 (e.g., 1, 10, 100) may be stored for each member (e.g., 1604, 1704) for attributes (e.g., estimated salary 1102). The number of samples (e.g., attribute sample 902) used to estimate the attribute may depend on the talent pool size 704 (e.g., talent pool 1602, 1702).

For example, when the talent pool size is between 1,000-100,000, talent-intelligence web 140 will query a column in Pinot of baseSalarySampleSize10 column to calculate a salary range (e.g., range 514) from the members (e.g., members 1604, 1704) of the talent pool (e.g., 1602, 1702). The 10 attribute samples 902 of each member may be combined (e.g., sorted according to salary 904), and then a 10/90 range may be determined. The database (e.g., Pinot 130) may include a top company table and the query 134 may be to each company in the top company table. Waterloo-member-attribute processor 110, member estimated attribute espresso 114, UMP, and/or pinot 130 may load the attribute samples into Pinot tables, in accordance with some embodiments.

Figure 8:
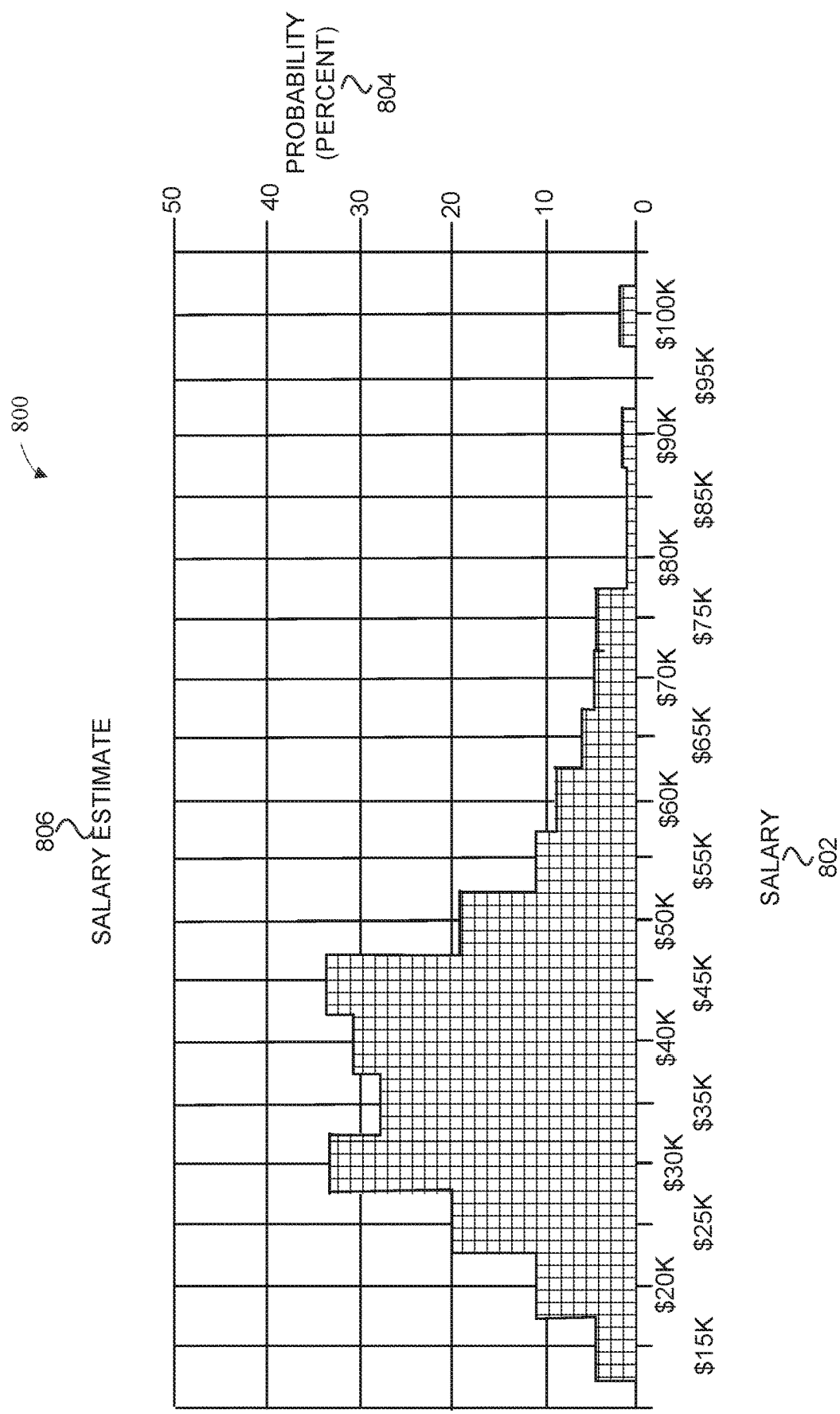
FIG. 8 illustrates a salary estimate, in accordance with some embodiments.

FIG. 8 illustrates a salary estimate 800, in accordance with some embodiments. Illustrated in FIG. 8 is salary estimate 806 with salary 802 along a horizontal axis and probability 804 along a vertical axis. Salary estimate 806 may be a histogram or probability distribution. FIG. 8 illustrates a probability 804 for a salary 802 for the salary estimation 806. For example, for a salary 802 of $25K there is a probability 804 of approximately 20 percent. In another example, for a salary 802 of $60K, there is a probability 804 of approximately nine percent. The salary estimate 806 is an example of an attribute estimate 1002, e.g., probability distribution 1007. The salary estimate 806 is an example of an estimated salary 1102, e.g., probability distribution 1107. The social network system 200 may be configured to take attribute estimates 1102 (e.g., randomly) from the salary estimate 800 and store them in pinot 130 for retrieval to satisfy queries 134 from talent-intelligent web 140.

Figure 9:
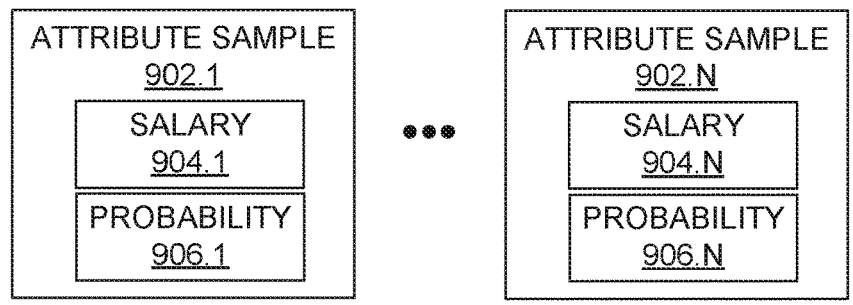
FIG. 9 illustrates attribute samples, in accordance with some embodiments.

FIG. 9 illustrates attribute samples 902, in accordance with some embodiments. Illustrated in FIG. 9 is attribute samples 902. Attribute samples 902 may include salary 904 and probability 906, in accordance with some embodiments. In some embodiments, attribute samples 902 may include different fields to represent different attributes, e.g., an attribute 1628 of member 1604, 1704 with representation 1630. As an example, attribute samples 902 may be for an estimate of a location 1619 of a member 1604 with a representation of a histogram.

Figure 10:
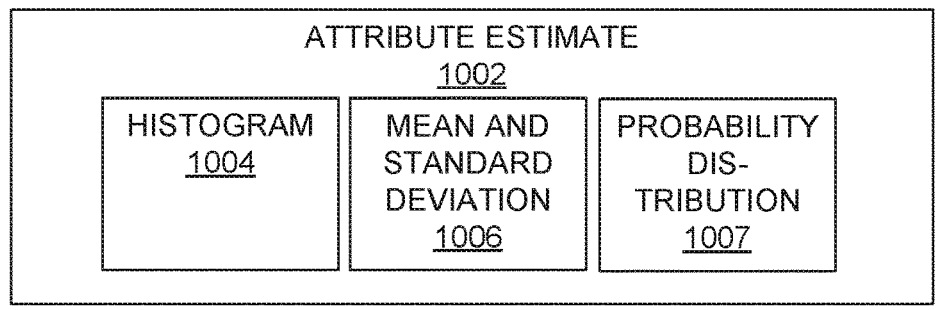
FIG. 10 illustrates an attribute estimate, in accordance with some embodiments.

FIG. 10 illustrates an attribute estimate 1002, in accordance with some embodiments. The attribute estimate 1002 may be an estimate of an attribute of a member 1604, 1704. The attribute estimate 1002 may include one or more of example representations such as histogram 1004, mean and standard deviation 1006, and probability distribution 1007. The histogram 1004 may be a histogram of values of the attribute vs. a probability of the value. The mean and standard deviation 1006 may be a mean value of the attribute estimate 1002 with a standard deviation. The probability distribution 1007 may be estimated values of the attribute with a probability of the value, e.g., estimate salary 806. Other representations of the estimated value of the attribute may be used, e.g., a mean value, a media value, etc.

Figure 11:
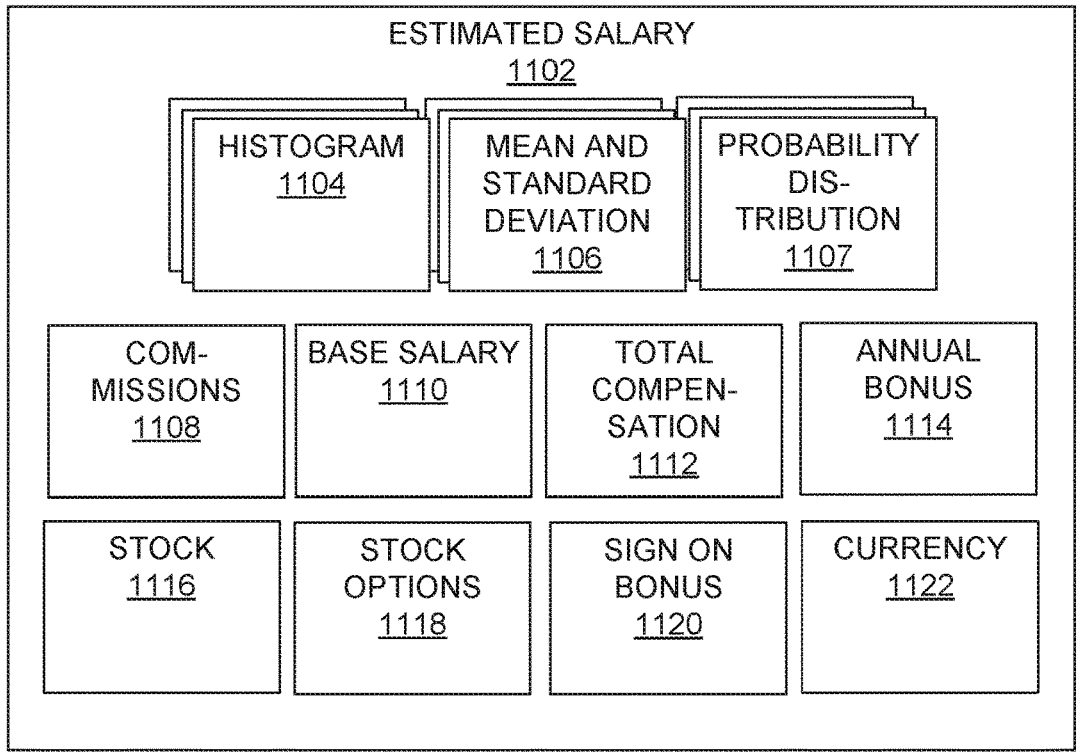
FIG. 11 illustrates an estimated salary, in accordance with some embodiments.

FIG. 11 illustrates an estimated salary 1102, in accordance with some embodiments. The estimated salary 1102 may be an attribute estimate 1002. The estimated salary 1102 may include one or more of: histogram 1104, mean and standard deviation 1106, probability distribution 1107, commissions 1108, base salary 1110, total compensation 1112, annual bonus 1114, stock 1116, stock options 1118, sign on bonus 1120, and currency 1122. The estimated salary 1102 may have different components, e.g., the commissions 1108, base salary 1110, annual bonus 1114, stock 1116, stock options 1118, sign on bonus 1120, etc. Each of the different components of the estimated salary 1102 may have their own attribute estimate 1002, e.g., histogram 1104, mean and standard deviation 1106, and/or probability distribution 1107. The total compensation 1112 may be an estimate based on the different components.

Figure 12:
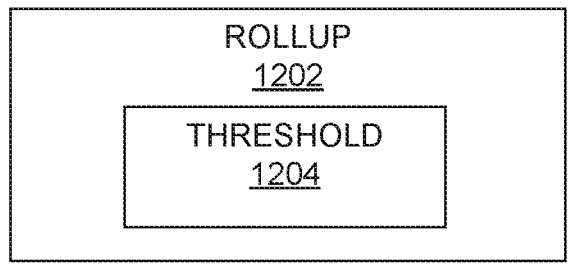
FIG. 12 illustrates rollup, in accordance with some embodiments.

FIG. 12 illustrates rollup 1202, in accordance with some embodiments. Rollup 1202 may include a threshold 1204, which may be a probability. Rollup 1202 may determine that a talent pool 1602, 1702, is too small such that a probability of an accurate estimate of an attribute, e.g., attribute estimate 1002, is too low. Rollup 1202 may then determine how to increase the talent pool to increase the probability of an accurate attribute estimate 1002, e.g., estimated salary 1102. For example, rollup 1202 may remove one or more of the selections made by a user in conjunction with FIG. 3, e.g., rollup 1202 may remove Europe 334 so that the talent pool 1602, 1702 is the entire world, etc. Rollup 1202 may determine remove different values of attributes selected by the user (e.g., as disclosed in conjunction with FIG. 3) to attempt to find a talent pool 1602, 1702 that provides a probability greater than the threshold 1204 for an attribute estimate. The threshold 1204 may also be determined based on a minimal number of members 1604, 1704 to protect the anonymity of the members. Rollup 1202 may be an application server module 210. Rollup 1202 may be part of or invoked by talent-intelligence web 140, pinot 130, and/or talent-intelligence backend 136. Rollup 1202 may provide a message indicating which values of attributes were not used, which may be displayed, e.g., on the results of FIGS. 4 and 5.

Figure 13:
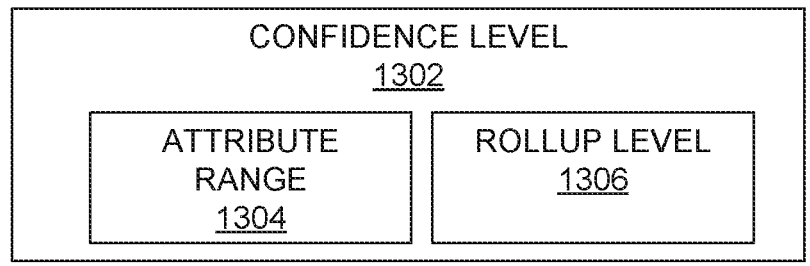
FIG. 13 illustrates confidence level, in accordance with some embodiments.

FIG. 13 illustrates confidence level 1302, in accordance with some embodiments. Confidence level 1302 may include attribute range 1304 and rollup level 1306. The confidence level 1302 may be a confidence level 1302 that an attribute estimate 1002 is within a threshold (not illustrated) of being accurate. A confidence level 1302 may decrease with greater a greater rollup level 1306, e.g., an estimated attribute 1002 such as estimated salary 1102 may have a lower confidence level 1302 if engineers are included in the estimated salary 1102 for electrical engineers. The inclusion of other engineers with electrical engineers may have been due to a small talent pool 1602, 1702 so that rollup 1202 decreased the values of the attributes to increase the talent pool 1602, 1702. Confidence level 1302 may be an application server module 210. Confidence level 1302 may be part of or invoked by talent-intelligence web 140, pinot 130, and/or talent-intelligence backend 136. Confidence level 1302 may provide a message indicating a confidence level, which may be displayed, e.g., on the results of FIGS. 4 and 5.

Figure 14:
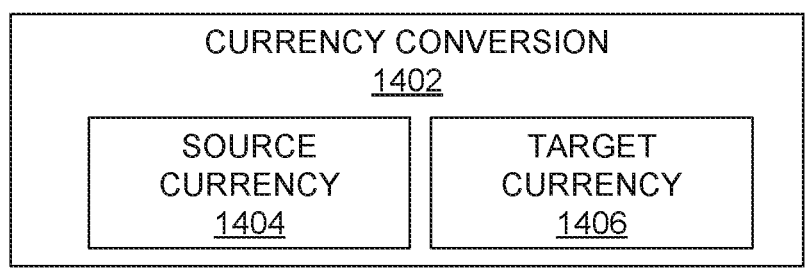
FIG. 14 illustrates currency conversion, in accordance with some embodiments.

FIG. 14 illustrates currency conversion 1402, in accordance with some embodiments. Currency conversion 1402 may include source currency 1404 and target currency 1406. Currency conversion 1402 may convert from the source currency 1404 to the target currency 1406. For example, currency conversion 1402 may convert currency 1122 from Euros to US dollars. Currency conversion 1402 may be an application server module 210. Currency conversion 1402 may be part of or invoked by talent-intelligence web 140, pinot 130, and/or talent-intelligence backend 136. Currency conversion 1402 may provide a message indicating a currency conversion, which may be displayed, e.g., on the results of FIGS. 4 and 5.

FIG. 15 illustrates a position 1500, in accordance with some embodiments. Position 1500 may include one or more of the following attributes: position title 1502, estimated salary 1102, length 1510, company 1512, position description 1514, industry 1516, region 1518, skills 1520, location 1522, and/or type of position 1524. One or more of the attributes may be an attribute estimate 1002. One or more of talent-intelligence web 140, pinot 130, talent-intelligence backend 136, waterloo-member attribute processor 110, and/or attribute-insight 102 may be configured to estimate one of the attributes. The position title 1502 may be a title of the position, e.g., electrical engineer, receptionist, etc. The estimate salary 1102 may be an estimated salary as disclosed herein. The length 1510 may be a length the member 1604, 1704 may have held the position 1500, which may be estimated by such things as when a position 1500 change was entered in a profile of the member 1604, 1704. The company 1512 may be an organization or company that the position 1500 is associated with. The position description 1514 may be a description of the position such as required education, responsibilities, estimated travel time, etc. The industry 1516 may be an industry associated with the company 1512, e.g., electronics, entertainment, etc. The industry 1516 may be an estimated industry from a government list of industries. The region 1518 may be a region that is estimated from the location 1522 and may be from a list of regions. The skills 1520 may be a list of skills that are required or recommended for the position 1500, e.g., education level, programming skills, etc. The location 1522 may be a location of the position 1500 that may include multiple locations. Location 1522 may be estimated, e.g., from a location of the company 1512. Type of position 1524 may indicate a type of position such as permanent, temporary, salaried, etc. The type of position 1524 may be a selection from pre-determined types of positions, which may be from the government. The type of position 1524 may be estimated from other attributes of position 1500 and/or other information. Position 1524 may include additional attributes. One of more of the attributes may be optional.

FIG. 16 illustrates a talent pool 1602, in accordance with some embodiments. The talent pool 1602 may include members 1604. The talent pool 1602 may be a query response 142 from a query 134 (FIG. 1). The members 1604 may include one or more of the following attributes: member identification (ID) 1606, education 1608, gender 1610, previous employment 1612, position 1500, date of birth 1615, location 1619, skills 1617, and attribute 1628. The member 1604 may be a member of social network system 200. The member 1604 information may be stored in the data layer 206, e.g., profile data 216, etc. The memberID 1606 may be an internal ID that is used with the social network system 200 such as a key that may be used in databases and/or a user name and password. The education 1608 may be the education credentials of the member 1604. The gender 1610 may be a gender of the member 1604. The previous employment 1612 may be previous positions 1500 the member 1604 has held. The position 1500 may be positions that the member 1604 currently holds. The data of birth 1615 may be a date of birth of the member 1604. The location 1619 may be a location of the member 1604. 'The skills 1617 may be skills of the member 1604, e.g., foreign languages, programming language, musical instruments, tests that have been pasted (e.g., certified public accountant), etc. Attribute 1628 may include representation 1630. The member 1604 may include additional attributes 1628 that may have a representation 1630. The representation 1630 of any of the attributes may be a number, a pointer to an outside source, histogram, mean and standard deviation, probability distribution, mean, median, etc. Member 1604 may include one or more additional attributes. One or more of the attributes may be optional.

Figure 17:
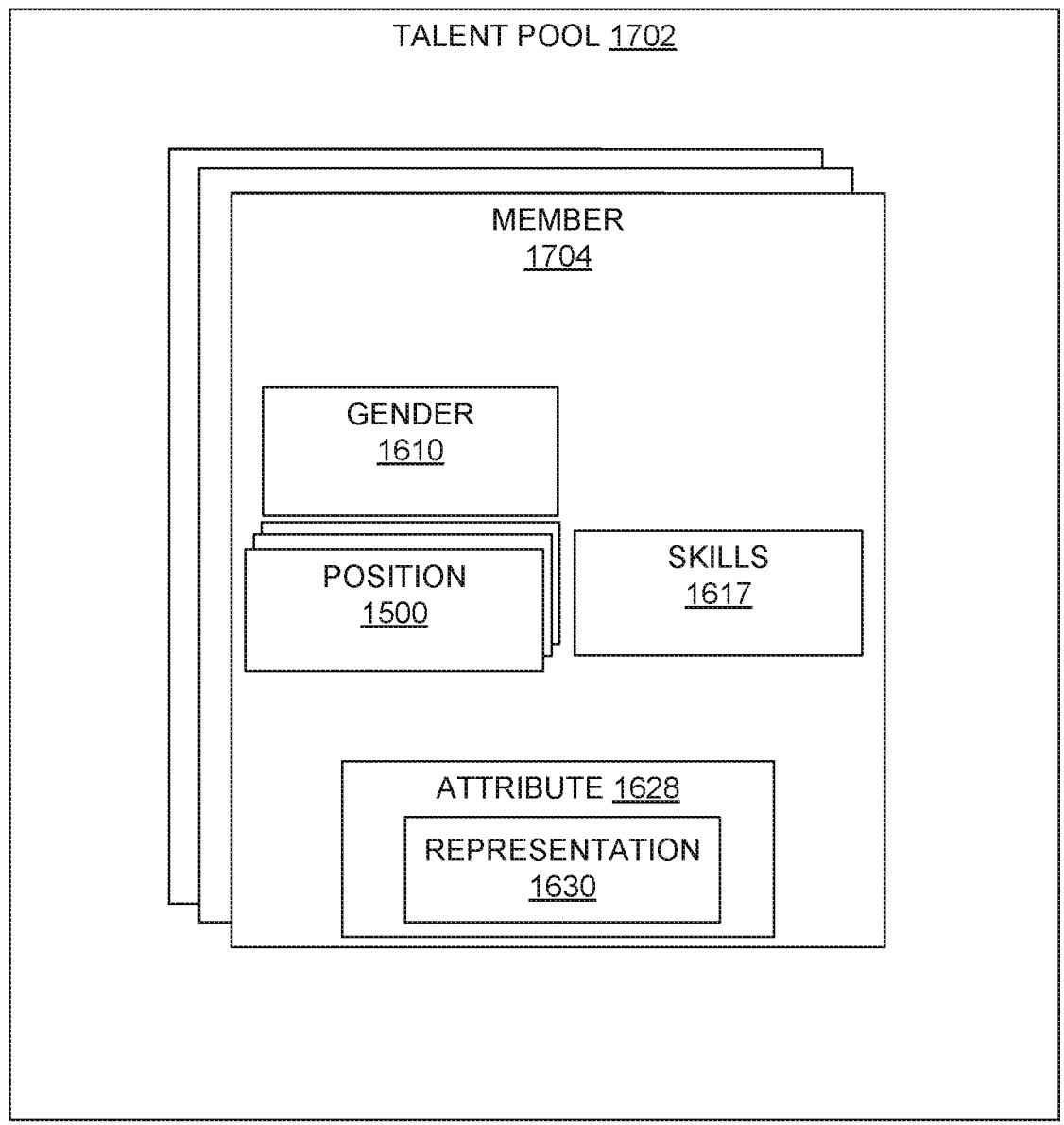
FIG. 17 illustrates a talent pool, in accordance with some embodiments.

FIG. 17 illustrates a talent pool 1702, in accordance with some embodiments. Talent pool 1702 may be the same or similar as talent pool 1602. Member 1704 may be the same or similar as member 1604. Member 1704 may have attributes removed to protect the privacy of the members. The attributes may be removed to prevent searches that would reveal identities of members. For example, the member:ID 1606 and date of birth 1615 may be removed. The talent-intelligence web 140, pinot 130, talent-intelligence backend 136, waterloo-member-attribute processor 110, and/or attribute-insight 102 may be configured to load the pinot 130 tables with member 1704 that has attributes of member 1604 removed for privacy of the members.

FIG. 18 illustrates a method 1800 to determine a range of an attribute, in accordance with some embodiments. Illustrated in FIG. 18 is operations 1802, 1804, 1806, 1808, 1810, and 1812 to determine a range of an attribute, e.g., referring to FIG. 5, method 1800 may be used to determine the range 514 of compensation 510 from a 10 percent of $83,000 to a 90 percent of $156,000. Method 1800 may be performed by talent-intelligence web 140, talent-intelligence backend 136, and/or pinot 130. Method 1800 may be a Pinot query, e.g., query 134. Method 1800 may be a database query. Talent-intelligence web 140 may use talent-intelligence API 138 to call functions provided by talent-intelligence backend 136 to perform method 1800, e.g., with parameters for operations (e.g., 1802, 1804, 1806, 1808, 1810, and 1812). A query response 142 is returned to talent-intelligence web 140, e.g., $83,000 and $156,000, in accordance with some embodiments.

Operations 1802, 1804, and 1806 indicate a select portion of a query where "baseSalaryRangeLowEnd" is for a 10 percentile (percentileest10MV) of salary (of a talent pool 1602, 1702) and where the sample size is 10 (e.g., sample number 712). And where "baseSalaryRangeHighEnd" is for a 90 percentile (percentileest90MV) of salary where the sample size is 10. Percentileest10MV may indicate to compile the estimated salary (e.g., as a probability distribution 1107 and then determine the 10th percentile). Operation 1808 indicates the attribute as memberPositionEstimatedSalary (e.g., estimated salary 1102). Operation 1810 indicates the filters that may be used to determine the talent pool (1604, 1704). For example, the top three organizations will be used (e.g., company 1512 of position would have to match one of the top three organizations) and "<custom filters>" allows for additional filters such as location 1619, e.g., FIG. 4 Top location for this talent 404. Operation 1812 indicates how the results should be returned.

Method 1800 may be a query 134 formed by talent-intelligence web 140 based on input from a user (e.g., as disclosed in conjunction with FIG. 3). The query response 142 may be displayed to a user (e.g., FIGS. 4 and 5).

In some embodiments, talent-intelligence web 140 may estimate the size of the talent pool 1604, 1704 and determine the sample size to use (in this case 10) based on the estimated sample size. In some embodiments, talent-intelligence web 140 will use a lower sample size (e.g., 1 or 10) and then if the talent pool is not large enough perform another query with the larger sample size (e.g., 100).

FIG. 19 illustrates a method 1900 to estimate an attribute of a member of a talent pool, in accordance with some embodiments. Illustrated in FIG. 19 is operations 1902, 1904, 1906, 1908, 1910, 1912, and 1914 to determine a range and mean of an attribute, e.g., referring to FIG. 5, method 1900 may be used to determine the range 514 and average 512 of compensation 510 from a 10 percent of $83,000 to a 90 percent of $156,000. Method 1900 may be performed by talent-intelligence web 140, talent-intelligence backend 136, and/or pinot 130. Method 1900 may be a Pinot query, e.g., query 134. Method 1900 may be a database query. Talent-intelligence web 140 may use talent-intelligence API 138 to call functions provided by talent-intelligence backend 136 to perform method 1900, e.g., with parameters for operations (e.g., 1902, 1904, 1906, 1908, 1910, 1912, and 1914). A query response 142 is returned to talent-intelligence web 140, e.g., $83,000 and $156,000, in accordance with some embodiments.

Operations 1902, 1904, 1906, and 1908 indicate a select portion of a query where talentPoolBaseSalaryMean" is for a mean of salary. And where "baseSalaryRangeLowEnd" is for a 10 percentile (percentileest10MV) of salary (of a talent pool 1602, 1702) and where the sample size is 10 (e.g., sample number 712). And where "baseSalaryRangeHighEnd" is for a 90 percentile (percentileest90MV) of salary where the sample size is 10. Percentileest10MV may indicate to compile the estimated salary (e.g., as a probability distribution 1107 and then determine the 10th percentile). Operation 1910 indicates the attribute as memberPositionEstimatedSalary (e.g., estimated salary 1102). Operation 1812 indicates the filters that may be used to determine the talent pool (1604, 1704). For example, the top three organizations will be used (e.g., company 1512 of position would have to match one of the top three organizations) and "<custom filters>" allows for additional filters such as location 1619, e.g., FIG. 4 Top location for this talent 404. Additionally, a confidence score is required to be over 0.8 for a member 1604, 1704 to be included.

Method 1900 may be a query 134 formed by talent-intelligence web 140 based on input from a user (e.g., as disclosed in conjunction with FIG. 3). The query response 142 may be displayed to a user (e.g., FIGS. 4 and 5).

In some embodiments, talent-intelligence web 140 may estimate the size of the talent pool 1604, 1704 and determine the sample size to use (in this case 10) based on the estimated sample size. In some embodiments, talent-intelligence web 140 will use a lower sample size (e.g., 1 or 10) and then if the talent pool is not large enough perform another query with the larger sample size (e.g., 100).

Figure 20:
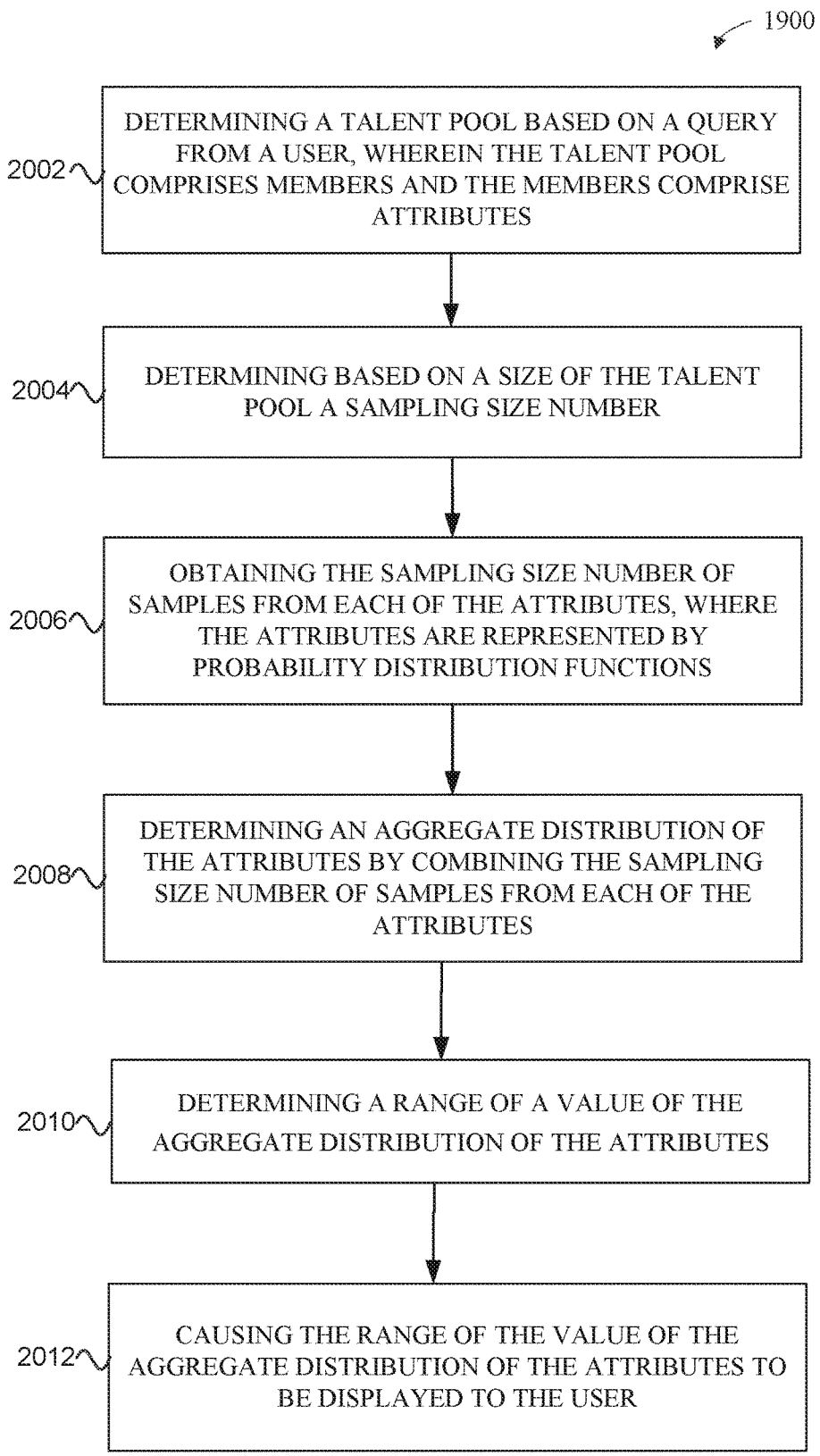
FIG. 20 illustrates a method to estimate an attribute of a member of a talent pool, in accordance with some embodiments.

FIG. 20 illustrates a method 2000 to estimate an attribute of a member of a talent pool, in accordance with some embodiments. The method 2000 begins at operation 2002 with determining a talent pool based on a query from a user, where the talent pool comprises members and the members comprise attributes. For example, a user may enter a query (e.g., 134) using the interface disclosed in conjunction with FIG. 3. The query response 142 may be a talent pool 1602, 1702, with a number of members (e.g., 1604, 1704).

The method 2000 may continue at operation 2004 with determining based on a size of the talent pool a sampling size number. For example, one or more of talent-intelligence web 140, talent-intelligence backend 136, pinot 130, and waterloo-member-attribute processor 110 may determine a sample number 702 to use based on a talent pool size 704.

The method 2000 may continue at operation 2006 with obtaining the sampling size number of samples from each of the attributes, where the attributes are represented by probability distribution functions. For example, one or more of talent-intelligence web 140, talent-intelligence backend 136, pinot 130, and waterloo-member-attribute processor 110 may sample (e.g., attribute sample 902) the attributes (e.g., estimated salary 1102) of the members 1604, 1704, of the talent pool 1602, 1702.

The method 2000 may continue at operation 2008 at determining an aggregate distribution of the attributes by combining the sampling size number of samples from each of the attributes. For example, one or more of talent-intelligence web 140, talent-intelligence backend 136, pinot 130, and waterloo-member-attribute processor 110 may combine the samples (e.g., attribute samples 902).

The method 2000 continues at operation 2010 with determining a range of a value of the aggregate distribution of the attributes. For example, one or more of talent-intelligence web 140, talent-intelligence backend 136, pinot 130, and waterloo-member-attribute processor 110 may determine a range (e.g., range 514) of a value of the aggregated distribution of the attributes (e.g., attribute samples 902).

The method 2000 continues at operation 2012 with causing the range of the value of the aggregate distribution of the attributes to be displayed to the user. For example, talent-intelligence web 140 may display range 514. One or more of the operations of method 2000 may be optional. The method 2000 may include one more additional operations. The method 2000 may be performed in a different order than disclosed herein.

Figure 21:
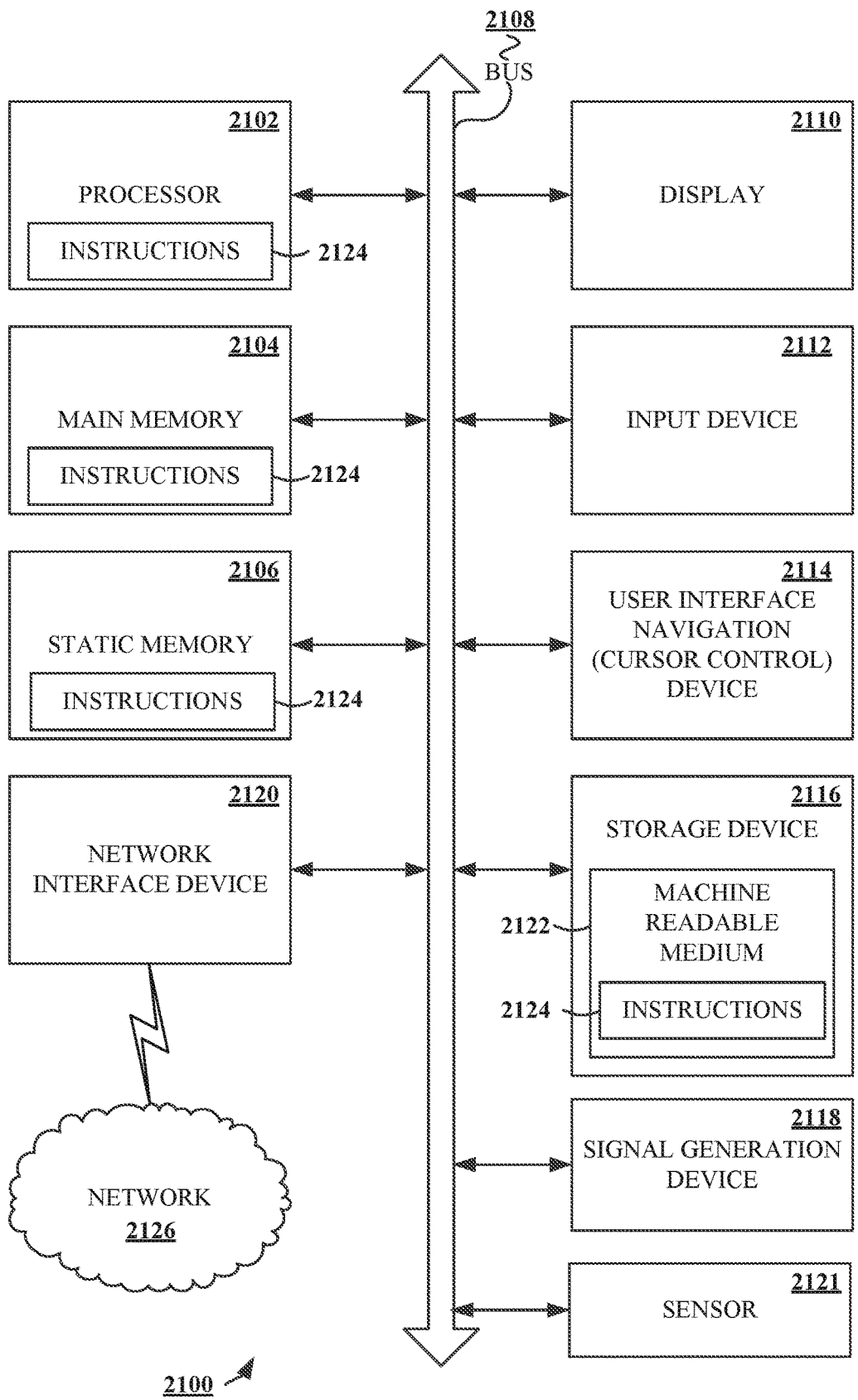
FIG. 21 shows a diagrammatic representation of the machine in the example form of a computer system and within which instructions (e.g., software) for causing the machine to perform any one or more of the methodologies discussed herein may be executed.

FIG. 21 shows a diagrammatic representation of the machine 2100 in the example form of a computer system and within which instructions 2124 (e.g., software) for causing the machine 2100 to perform any one or more of the methodologies discussed herein may be executed. In alternative embodiments, the machine 2100 operates as a standalone device or may be connected (e.g., networked) to other machines. In a networked deployment, the machine 2100 may operate in the capacity of a server machine or a client machine in a server-client network environment, or as a peer machine in a peer-to-peer (or distributed) network environment. The machine 2100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 2124, sequentially or otherwise, that specify actions to be taken by that machine. Further, while only a single machine is illustrated, the term "machine" shall also be taken to include a collection of machines that individually or jointly execute the instructions 2124 to perform any one or more of the methodologies discussed herein in conjunction with FIGS. 1-20.

The machine 2100 includes a processor 2102 (e.g., a central processing unit (CPU), a graphics processing unit (GPU), a digital signal processor (DSP), an application specific integrated circuit (ASIC), a radio-frequency integrated circuit (RTIC), or any suitable combination thereof), a main memory 2104, and a static memory 2106, which are configured to communicate with each other via a bus 2108. The machine 2100 may further include a graphics display 2110 (e.g., a plasma display panel (PDP), a light emitting diode (LED) display, a liquid crystal display (LCD), a projector, or a cathode ray tube (CRT)). The machine 2100 may also include an alphanumeric input device 2112 (e.g., a keyboard), a user interface navigation (cursor control) device 2114 (e.g., a mouse, a touchpad, a trackball, a joystick, a motion sensor, or other pointing instrument), a storage unit 2116, a signal generation device 2118 (e.g., a speaker), and a network interface device 2120.

The storage unit 2116 includes a machine-readable medium 2122 on which is stored the instructions 2124 (e.g., software) embodying any one or more of the methodologies or functions described herein. The instructions 2124 may also reside, completely or at least partially, within the main memory 2104, within the processor 2102 (e.g., within the processor's cache memory), or both, during execution thereof by the machine 2100. Accordingly, the main memory 2104 and the processor 2102 may be considered as machine-readable media. The instructions 2124 may be transmitted or received over a network 2126 via the network interface device 2120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 2100), such that the instructions, when executed by one or more processors of the machine (e.g., processor 2102), cause the machine to perform any one or more of the methodologies described herein. Accordingly, a "machine-readable medium" refers to a single storage apparatus or device, as well as "cloud-based" storage systems or storage networks that include multiple storage apparatus or devices. 'The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method, the method comprising:

determining, by at least one hardware processor, a talent pool based on a query from a user, wherein the talent pool comprises members and the members comprise attributes, wherein the attributes are represented by probability distributions;

determining, by at least one hardware processor, based on a size of the talent pool a sampling size number;

obtaining, by at least one hardware processor, the sampling size number of samples from each of the probability distributions;

determining, by at least one hardware processor, an aggregate distribution of the attributes by combining the sampling size number of samples from each of the probability distributions;

determining, by at least one hardware processor, a range of a value of the aggregate distribution of the attributes; and causing, by at least one hardware processor, the range of the value of the aggregate distribution of the attributes to be displayed to the user.

2. The computer-implemented method of claim 1, wherein the method further comprises:
determining the sampling size number to be 1 to 9 if the size of the talent pool is greater than 100,000;
determining the sampling size number to be 5 to 50 if the size of the talent pool is between 1,000 and 100,000; and
determining the sampling size number to be over 50 if the size of the talent pool is less than 1,000.

3. The computer-implemented method of claim 1, wherein the query comprises values for other attributes of the members and the talent pool, and wherein the method further comprises:
determining the members of the talent pool based the other attributes of the members matching the values for the other attributes.

4. The computer-implemented method of claim 1, wherein attributes are estimated salaries represented by the probability distributions.

5. The computer-implemented method of claim 4, wherein the aggregate distribution comprises pairs of numbers with a first number representing a salary and a second number representing a probability of the salary.

6. The computer-implemented method of claim 1, wherein the method further comprises:
determining the range of the value of the aggregate distribution of the attributes to comprise a low value and a high value, wherein the low value is greater than 10 percent of the samples of the aggregate distribution and the high value is greater than 90 percent of the samples of the aggregate distribution.

7. The computer-implemented method of claim 1, wherein the method further comprises:
determining the sampling size number to be 1 to 100 based on the size of the talent pool.

8. The computer-implement method of claim 1, wherein the method further comprises:
determining a median value of the aggregate distribution of the attributes to comprise a median value, wherein the median value is greater than 50 percent of the samples of the aggregate distribution;
determining a mean value of the aggregate distribution of the attributes to comprise a mean value, wherein the mean value is a weighted average of the aggregate distribution; and
causing, by at least one hardware processor, the median value and the mean value of the aggregate distribution of the attributes to be displayed to the user.

9. A system comprising:
a first machine-readable medium configured to store computer-executable instructions, and a second machine-readable medium configured to store samples from attributes; and
at least one hardware processor communicatively coupled to the first machine-readable medium and the second machine-readable medium that, when the computer-executable instructions are executed, the at least one hardware processor is configured to:
determine, by at least one hardware processor, for each of a plurality of sample size numbers, samples of each attribute of a plurality of attributes;
store in the second machine-readable medium, by at least one processor, the samples of each attribute of the plurality of attributes;
determine, by at least one hardware processor, a talent pool based on a query from a user, wherein the talent pool comprises members and the members comprise attributes and wherein the attributes are represented by probability distributions;
determine, by at least one hardware processor, based on a size of the talent pool a sampling size number;
retrieve from the second machine-readable medium, by at least one hardware processor, the sampling size number of samples from each of the probability distribution;
determine, by at least one hardware processor, an aggregate distribution of the attributes by combining the sampling size number of samples from each of the probability distributions;
determine, by at least one hardware processor, a range of a value of the aggregate distribution of the attributes; and
cause, by at least one hardware processor, the range of the value of the aggregate distribution of the attributes to be displayed to the user.

10. The system of claim 9, wherein the query comprises values for other attributes of the members and the talent pool, and wherein the at least one hardware processor is further configured to:
determine the members of the talent pool based on the other attributes of the members matching the values for the other attributes.

11. The system of claim 9, wherein attributes are estimated salaries represented by probability distributions, and wherein the attributes are stored in a different memory than the samples.

12. The system of claim 11, wherein the aggregate distribution comprises pairs of numbers with a first number representing a salary and a second number representing a probability of the salary.

13. The system of claim 9, wherein the at least one hardware processor is further configured to:
determine the range of the value of the aggregate distribution of the attributes to comprise a low value and a high value, wherein the low value is greater than 10 percent of the samples of the aggregate distribution and the high value is greater than 90 percent of the samples of the aggregate distribution.

14. The system of claim 9, the at least one hardware processor is further configured to:
determining the sampling size number to be 1 to 100 based on the size of the talent pool.

15. A non-transitory machine-readable medium storing computer-executable instructions stored thereon that, when executed by at least one hardware processor, cause the at least one hardware processor to perform a plurality of operations, the operations comprising:

determining a talent pool based on a query from a user, wherein the talent pool comprises members and the members comprise attributes, wherein the attributes are represented by probability distributions;

determining based on a size of the talent pool a sampling size number;

obtaining the sampling size number of samples from each of the probability distributions;

determining an aggregate distribution of the attributes by combining the sampling size number of samples from each of the probability distributions;

determining a range of a value of the aggregate distribution of the attributes; and causing the range of the value of the aggregate distribution of the attributes to be displayed to the user.

16. The non-transitory machine-readable medium of claim 15, wherein the plurality of operations further comprise:

determining the sampling size number to be 1 to 9 if the size of the talent pool is greater than 100,000;

determining the sampling size number to be 5 to 50 if the size of the talent pool is between 1,000 and 100,000; and determining the sampling size number to be over 50 if the size of the talent pool is less than 1000.

17. The non-transitory machine-readable medium of claim 15, wherein the query comprises values for other attributes of the members and the talent pool, and wherein the plurality of operations further comprise:

determining the members of the talent pool based the other attributes of the members matching the values for the other attributes.

18. The non-transitory machine-readable medium of claim 15, wherein attributes are estimated salaries represented by the probability distributions.

19. The non-transitory machine-readable medium of claim 18, wherein the aggregate distribution comprises pairs of numbers with a first number representing a salary and a second number representing a probability of the salary.

20. The non-transit, machine-readable medium of claim 19, wherein the plurality of operations further comprise:

determining the range of the value of the aggregate distribution of the attributes to comprise a low value and a high value, wherein the low value is greater than 10 percent of the samples of the aggregate distribution and the high value is greater than 90 percent of the samples of the aggregate distribution.

* * * * *

UNITED STATES PATENT AND TRADEMARK OFFICE
CERTIFICATE OF CORRECTION

PATENT NO. : 11,055,298 B2  
APPLICATION NO. : 16/230540  
DATED : July 6, 2021  
INVENTOR(S) : Zhou et al.

Page 1 of 1

It is certified that error appears in the above-identified patent and that said Letters Patent is hereby corrected as shown below:

In the Claims

Column 24, Line 19, Claim 9, delete "attributes" and insert --attributes,-- therefor Column 24, Line 25, Claim 9, delete "distribution;" and insert --distributions;-- therefor Column 24, Line 59, Claim 14, after "claim 9,", insert --wherein--

Column 26, Line 16, Claim 20, delete "non-transit," and insert --non-transitory,-- therefor Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*